United States Patent
Roseborough et al.

[11] Patent Number: 6,141,019
[45] Date of Patent: Oct. 31, 2000

[54] CREATURE ANIMATION AND SIMULATION TECHNIQUE

[75] Inventors: James B. Roseborough, 103 12th Ave., San Francisco, Calif. 94118; Timothy J. Kostolansky, Oakland, Calif.; Jaime R. del Palacio, Novato, Calif.

[73] Assignees: James B. Roseborough, San Francisco; Timothy Kostolansky, Oakland, both of Calif.

[21] Appl. No.: 09/029,466
[22] PCT Filed: Oct. 11, 1996
[86] PCT No.: PCT/US96/16332
   § 371 Date: Feb. 25, 1998
   § 102(e) Date: Feb. 25, 1998
[87] PCT Pub. No.: WO97/14102
   PCT Pub. Date: Apr. 17, 1997

Related U.S. Application Data
[60] Provisional application No. 60/007,082, Oct. 13, 1995, and provisional application No. 60/025,056, Sep. 3, 1996.

[51] Int. Cl.$^7$ ................................... G06T 15/00
[52] U.S. Cl. ............................................. 345/473
[58] Field of Search ................................ 345/473, 474

*Primary Examiner*—Phu K. Nguyen
*Assistant Examiner*—Cliff N. Vo
*Attorney, Agent, or Firm*—Hickman Stephens Coleman & Hughes, LLP

[57] ABSTRACT

A synthetic creature (10) in which links (26), representing limbs, are loosely connected by joints (28) to independently interact and implement the physics of everyday life-like actions (18) in a character (16). Elements of mass, positive weight (46), and negative weight (48) are independently handled to mimic the closed-loop control characteristics of real animals. The synthetic creature (10) uses intelligent appearing behaviors (20) built up out of the actions (18) and recursively arranged in a hierarchical behavior tree (72) to cooperate and compete in a run-time computer (202) to give a feeling of autonomy and awareness. Further taught is an authoring environment (200) of tools used to author the character (16), actions (18), and behaviors (20) of the synthetic creature (10), which provide author feedback and simulation testing capability at the various layers (12) of the synthetic creature (10).

24 Claims, 20 Drawing Sheets

CREATURE ANIMATION AND SIMULATION TECHNIQUE

CROSS-REFERENCE TO RELATED APPLICATIONS

This application claims benefit of both U.S. Provisional Application No. 60/007,082, filed Oct. 13, 1995, titled "CREATURE ANIMATION AND SIMULATION TECHNIQUE," by inventors James B. ROSEBOROUGH and Timothy J. KOSTOLANSKY, and U.S. Provisional Application No. 60/025,056, filed Sep. 3, 1996, also titled "CREATURE ANIMATION AND SIMULATION TECHNIQUE," by inventors James B. ROSEBOROUGH, Timothy J. KOSTOLANSKY and Jaime R. del PALACIO.

TECHNICAL FIELD

The present invention relates generally to techniques used in simulating life-like characteristics in computer implemented simulations of bipeds, quadrupeds, and more complex creatures, as well as life-like motion of simple physical objects. It is the inventors anticipation that the invention will find primary application in the field of real-time computer generated graphics used for amusement. However, the invention also has potential application to more complex and non-real-time computer graphics fields, such as cartoon drafting, game scripting, advertising, event recreation, simulation of virtually any living organisms, and life-like motion of simpler physical objects.

BACKGROUND ART

Computer simulations of believable life-like behavior have been sought since virtually the first computer system was developed. Inherently users of computers have equated the logical abilities of computers to the ability to act in realistic "animalistic" manners, unfortunately often with disappointing results. Characteristics such as autonomous behavior, which is perceivable as personality, have been elusive to obtain, and when obtainable to any appreciable degree have required considerable human programming talent in traditional computer languages (which are notably difficult to learn, and inflexible and unforgiving to use). Such characteristics further have required considerable computer resources to implement and execute. Some succinct examples serves to illustrate this. How does one implement a simulated creature that has a behavior which is recognizable, and personally identified with by users, as "tired"? How does one implement a simulated creature so realistic that users forget that it is "virtual," and automatically attempt to speak to it?

Numerous attempts have been made to present users (i.e., viewers) with life-like simulations. Considerable work in this area (e.g., by Disney Studios and others), but all examples known to the inventors have used human animators. Some of these efforts have used sprite based animation, requiring ahead-of-time animation of set sequences, usually by human illustrators. Recently, largely in response to the phenomenal increases in computer system capabilities due to component price decreases, memory size increases, and processor power increases somewhat realistic simulations have begun to appear in the market, but these are still largely ahead-of-time animation of set sequences, stored in mass on voluminous media such as CD ROMs, comprehensively indexed for retrieval, and rapidly presentable on increasingly powerful computers so that users perceive them to be running in real-time (e.g., Doug Sharp of Microsoft Corporation's Advanced Authoring Tools Division pre-scripted interactive story titled "The King of Chicago," which uses hundreds of scenes of possible situations).

Notable exceptions to the above statements do exist, including the work of Massachusetts Institute of Technology's Media Lab such as Bruce Blumburg's "virtual dog," implemented on a system termed the Artificial Life Interactive Video Environment. However, considerable improvement over even this is eagerly sought by computer users, who desire true three-dimensional interactive simulations of lower animals, humans, and even life-like behaviors imparted to mere physical objects. Further, to coin a term, users seek "synthetic creatures" having improved representational simulation (as contrasted to the overwhelming prior art concentration on mere presentational simulation techniques). Still further, an eager body of authors seek tools with which to supply the noted demands of users, tools which provide reusability and portability of work product, yet which do not require the effort of learning traditional programming languages and techniques, and which eliminate the frustration and inefficiency generally experienced in dealing with the inflexibility and syntactical rigidity of traditional programming systems.

Finally, the term "virtual dog" has been used above, and it should be noted that the term "virtual pet" has come into (and perhaps already left) vogue. Bruce Blumburg's accomplishment is quite noteworthy, and other similarly noteworthy efforts exist (e.g., DOGZ by PF Magic of San Francisco, Calif.). However, to date, the inventors know of no simulation technologies which address what they perceive to be a first key obstacle to implementing and presenting simulated life-like behavior in real-time on commonly available computers, providing efficient usable tools to generate efficiently runable underlying physics, mechanical properties, and user perceivable properties (e.g., visual and audible properties) of synthetic creatures. Further, the inventors know of no simulation technologies, to date, which address what they perceive to be a second key obstacle in this field, providing a simple and efficient mechanism for defining and executing behaviors of such synthetic creatures.

DISCLOSURE OF INVENTION

Accordingly, it is an object of the present invention to provide simulations having improved life-like qualities.

Another object of the invention is to provide simulations which run efficiently on conventional computer systems.

Another object of the invention is to provide simulations which are are highly animated and have a truly interactive nature.

And, another object of the invention is to provide tools for authoring the improved simulations discussed above.

Briefly, one preferred embodiment of the present invention is a method of creating and simulating a synthetic creature on a computer system by authoring a character for the synthetic creature containing links and soft joints joining all but one such previously defined link, then authoring actions for the synthetic creature by positioning the character into a pose by moving the links into desired positions, and storing one or more such pose as an action. At this point the synthetic creature is sufficiently complete to be executed on a computer. Optionally, a behavior tree for the synthetic creature may be authored by defining behaviors which are grouped instances of actions and other previously defined behaviors, and recursively ordering the behaviors into the behavior tree in a hierarchical structure which is executable on the computer system.

An advantage of the present invention is that highly realistic and endearing life-like qualities are imparted to simulations using the invention.

Another advantage of the invention is that the simulations produced using the invention may be efficiently implemented on a wide range of available computer systems, including typical personal computers, workstations, and mainframe type computers.

Another advantage of the invention is that the simulations produced using the invention may be made highly interactive with other aspects of computer generated environments, and with users of computer systems.

Another advantage of the invention is that the simulations produced using the invention use a high level authoring of animated content, close to the human thinking process.

Another advantage of the invention is that the simulations produced using the invention is that it allows definition of animated works which are small and highly efficient encodings of animation.

And, another advantage of the invention is that it may be easily adapted to emerging computer technologies, such as the Internet, for online use of pre-authored implementations of the invention.

These and other objects and advantages of the present invention will become clear to those skilled in the art in view of the description of the best presently known mode of carrying out the invention and the industrial applicability of the preferred embodiments as described herein and as illustrated in the several figures of the drawings.

BRIEF DESCRIPTION OF THE DRAWINGS

The purposes and advantages of the present invention will be apparent from the following detailed description in conjunction with the appended drawings in which.

BEST MODES FOR CARRYING OUT THE INVENTION

Figure 1:
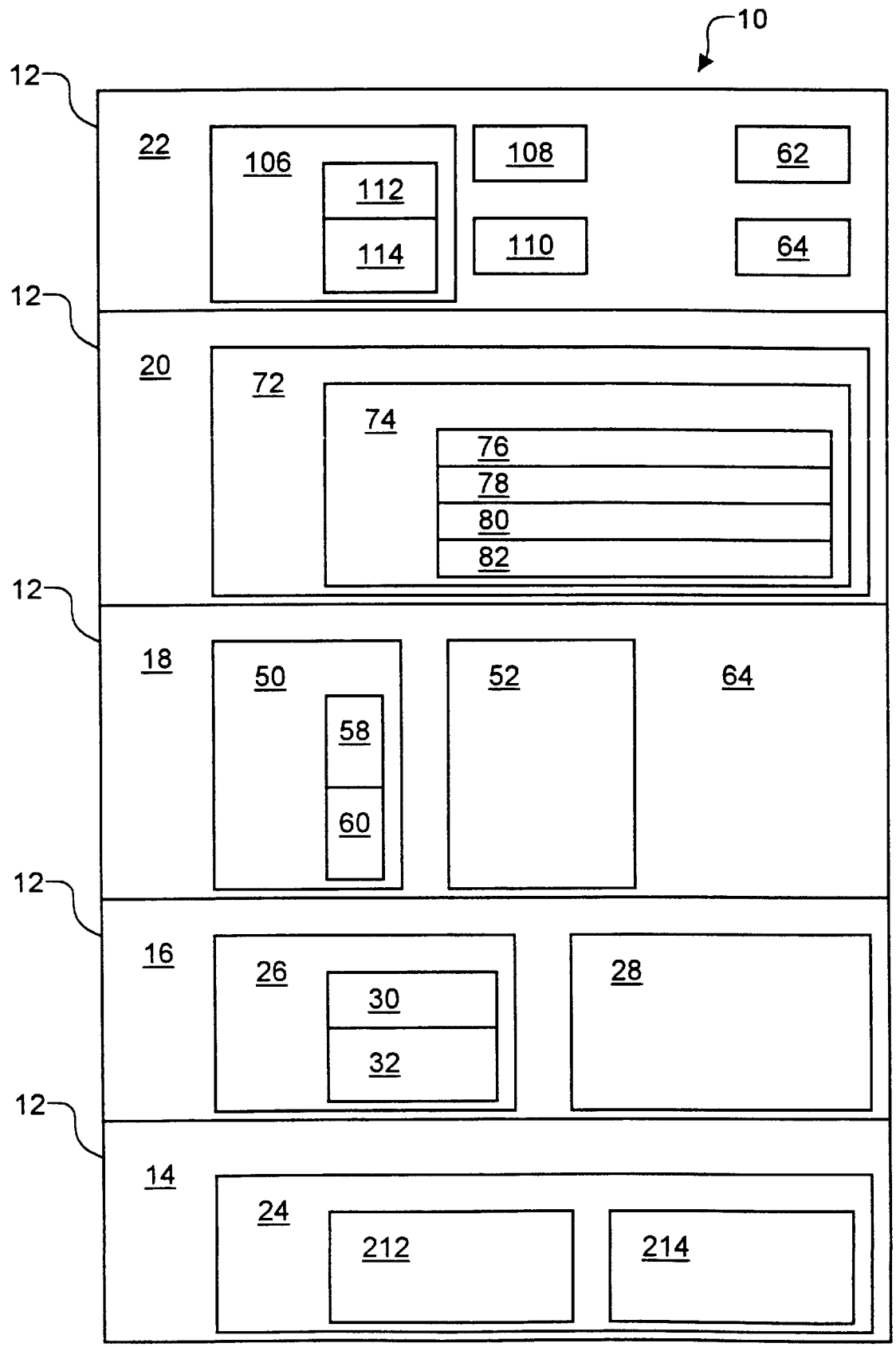
FIG. 1 is a chart of layers and some of the elements used at respective layers when authoring the synthetic creatures of the present invention.

The preferred embodiments of the present invention are simulated creatures, and a group of simulation authoring tools for creating and enhancing various aspects of such creatures. Specifically, the members of the group of simulation authoring tools include a universe editor, a character editor, an action editor, a behavior editor, and an environment editor. Further, not all of the authoring tools are necessarily distinct, or necessarily needed for all implementations of synthetic creatures.

The initial goal of development which lead to the present invention was creation of simulated creatures, specifically "virtual pets" which run in computer generated environments and optionally interacted with users of the host computer system. The inventors have since further refined the invention and extended its capabilities to include simulating non-pet-like animals, simulating characterized humans, and simulating characteristics of life in inanimate objects. Over time the products of the present invention have been termed simulations, virtual pets, and most recently synthetic creatures. Herein the term synthetic creature will be used, and will be referred to by the general reference character 10.

DEFINING LIFE IN A SYNTHETIC CREATURE:

The inventors have modeled their synthetic creatures 10 using a system with a number of distinguishable layers 12 (FIG. 1). In the preferred embodiment these layers 12 include the universe 14 where the synthetic creature 10 "lives," the character 16 (basic physical characteristics; e.g., cat vs. dog, long limbs vs. short, etc.) which the synthetic creature 10 will have, the actions 18 which the synthetic creature 10 will be capable of, the behaviors 20 which the synthetic creature 10 will exhibit, and the environment 22 in which the synthetic creature 10 will perform. By dealing with these layers 12 separately the inventors have been able to abstract out much simulation complexity. Another key benefit of the use of layers 12 is that the invention may be more easily implemented so that authors (a term herein used to refer to those who create synthetic creatures 10) and users (herein used to refer to those who ultimately use already authored synthetic creatures 10) do not need any programming experience per se, since simple "applications program" type interfaces may be used for authoring the layers 12, and no "code" in a traditional computer language need be used by either the authors or users. (Although considerable power can be added to the layers 12 by adding special modules, which may use more traditional computer code methodologies, if desired.) This approach leads to the synthetic creatures 10 which are very quickly and easily changed and enhanced. Further, this approach makes possible considerable work reusability and portability of work for synthetic creatures 10, on all of the layers 12. For example, attributes of a dog synthetic creature 10 may be easily reused (even put in libraries, and distributed as such to other authors) to create other dog synthetic creatures 10, and physical attributes of a dog synthetic creature 10 may be combined with behavioral attributes of a cat synthetic creature 10, to create unusual results. Still further, the use of distinct layers 12 permits abstracting out much authoring complexity.

The layers 12 may be distinguishable, but it is not absolutely necessary that this always be done. For example, the universe 14 and the character 16 are two layers 12 which the inventors presently do not make highly distinct. To date, the inventors have simply incorporated the universe 14 into embodiments of the character 16. However, there is no reason why the universe 14 can not be implemented as a truly separate layer 12, and it is envisioned that capabilities of the synthetic creatures 10 would be expanded in useful manner if this were done, say to use as a teaching aid for physical mechanics, or to try out non-Newtonian rules of physics.

The Universe of a Synthetic Creature:

For a synthetic creature 10 to appear realistic the universe 14 in which it lives should be constant, i.e., it should impose the same rules of physics on a synthetic creature 10 as it does on other objects in that universe 14. For example, a synthetic creature 10 and a ball which it is playing with should both obey the same rules, say of Newtonian physics. This requires that the universe 14 specify in some manner an underlying physics 24.

As noted, above, the inventors integrate the universe 14 into the character 16 in present implementations. This relieves authors of the need to separately concern themselves with the universe 14, when an earth-normal type universe 14 is used.

Conceptually the universe 14 is the lowest layer 12. However, unlike higher layers 12 which have little meaning without lower layers 12 (e.g., behaviors 20 can not be authored without existing actions 18 to work with, and while actions 18 can not be authored without an existing character 16 to work with) the pre-existence of a universe 14 is not always necessary for authoring of the higher layers 12. However, not placing the universe 14 at the lowest layer 12 can lead to problems. The classic squared-cubed problem of mechanics is one example (this support structure vs. mass problem is the reason why weighty creatures must look like elephants or hippos, with thick legs, and why very light creatures can have very thin legs, like ants and spiders). If "realities" of a universe 14 are not imposed upon the character 16 of a synthetic creature 10 early, considerable work on actions 18 and behaviors 20 may be adversely effected.

Figure 2:
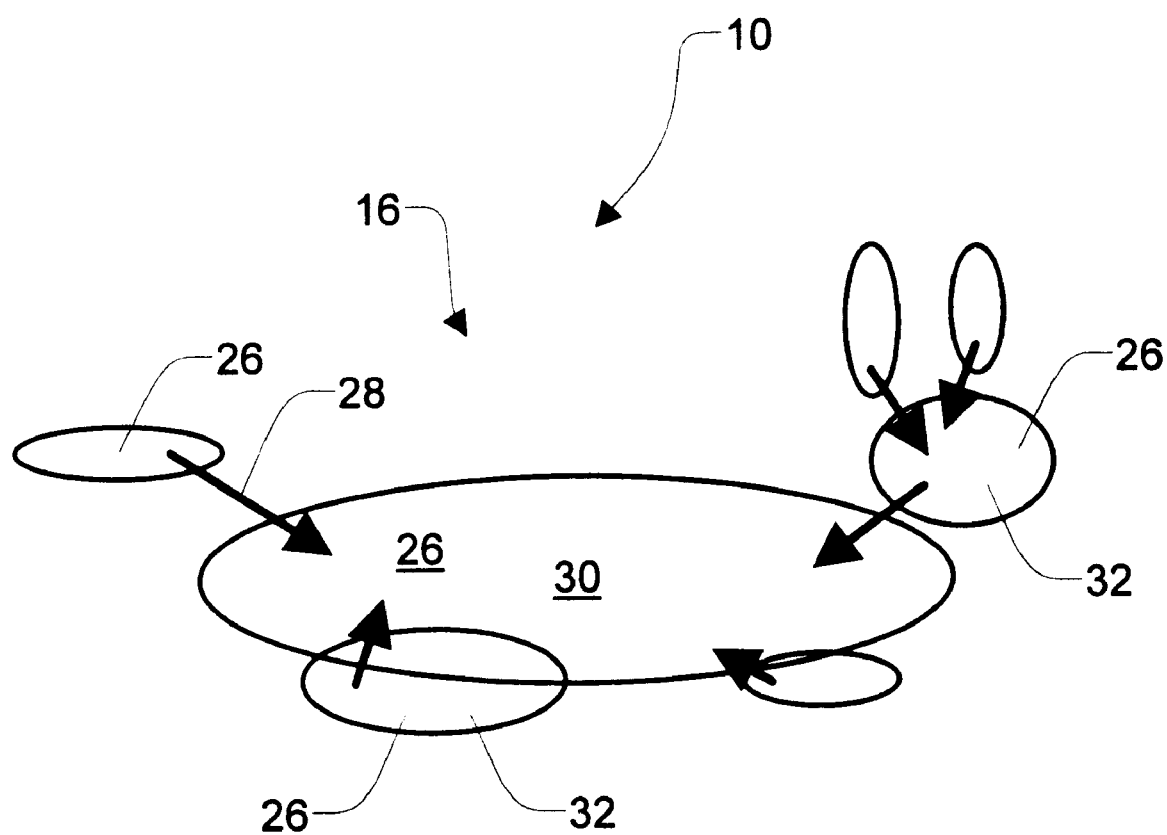
FIG. 2 is a depiction of a basic simulated animal, illustrating joint and link relationships.

The Character of a Synthetic Creature:

FIG. 2 depicts a very basic generic synthetic creature 10. The joints and limb segments of the synthetic creature 10 there are shown as loosely connected interacting independent links 26 (depicted by ovals, or more correctly ellipsoids, since the character 16 is a three-dimensional representation) and joints 28 (depicted by arrowed lines with the arrow end pointing at a higher level link 26) that implement the physics of everyday life (i.e., they function subject to the rules of the universe 14). The links 26 represent rigid physical objects, while the joints 28 are manifested as an interaction between two specific links 26. This provides a very soft fluid feeling to the synthetic creature 10, not present in other work to date.

Conceptually, characters 16 are hierarchical, starting with a non-associated link 30 at the highest level, and having depending child links 32 at lower levels in the hierarchy. Child links 32 are links 26 which have an associated joint 28 connecting them to higher ordered links 26, until the non-associated link 30 is reached. Links 26 receive interaction forces and torque from each of the joints 28 lower in the hierarchy (although this may be extensively controlled by specifying various types of joints 28 which interact in special manners).

Figure 3:
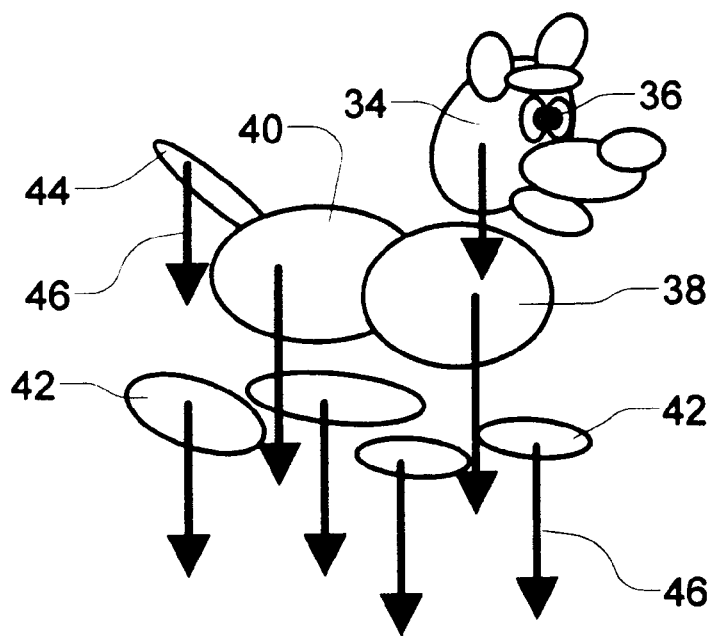
FIG. 3 is a depiction of a simulated animal, illustrating major body parts and stylistically illustrating positive weight elements.

FIG. 3 illustrates a number of recognizable body parts for a typical synthetic creature 10, which will be referred to often herein. These include a head link 34 (with features such as eye links 36), a chest link 38, a lower body link 40, foot links 42, and a tail link 44.

Figure 4:
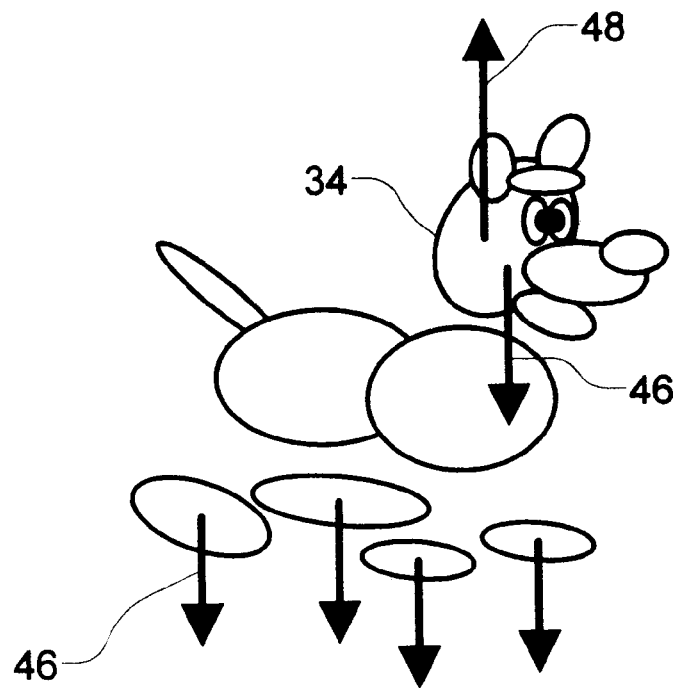
FIG. 4 is a depiction of the same simulated animal of FIG. 3, stylistically illustrating positive and negative weight elements together.

FIG. 3 and FIG. 4 also illustrate how a synthetic creature 10 is able to right itself, and otherwise control itself in an environment 22. The components of weight and mass are shown split out for each link 26 and treated separately, so that the overall behavior of a synthetic creature 10 closely mimics the closed-loop controlled behavior of a real animal, endowing the synthetic creature 10 with additional lifelike qualities. Weight is depicted by downward pointing arrows for positive weight 46 and upward pointing arrows for negative weight 48. Mass, which is never negative, is not represented by any element in the figures, since its presence is implied.

Soft Joints:

Part of simulating an animal requires simulating the dynamic characteristics of its links 26 (i.e., its limb segments) and the joints 28 connecting them. The classical approach to this problem has been to put infinitely stiff joints, in the form of mathematical constraints, between links representing each limb segment, and then solve the complete mathematics of the system at each time step. Unfortunately, the number of computations in this approach increases as the cube of the number of links, or becomes intractable due to the need to invert a complex non-linear functional relationship (the "inverse kinematics" problem), since the whole system of characteristic equations of motion must be formulated completely beforehand. Further, overall, this approach produces motion that is stiff, mechanical, and robotic. However, this traditional approach is widespread because most animals have relatively stiff joints in some dimensions, and flexibility in other dimensions, and it therefore initially seems appropriate to introduce the stiffness as a set of mathematical constraints. This approach is also common in the robotics field, where devices are built to be stiff in linear and angular degrees of freedom.

In contrast to the traditional approach, the inventors formulate each link 26 independently of the others, so that the number of computations at each time step is proportional to the number of links 26 rather than the cube of that number. The inventors have termed this concept "soft joints," since it is a way of simulating a combination of joints 28 and links 26 (i.e., limb segments) in a synthetic creature 10 that results in a very fluid, soft, and natural appearance. Since each link 26 behaves independently, its equations of motion need be implemented only once. In this manner a meaningful approximation to a true massy six-degree-of-freedom model becomes feasible, and imparts an additional realism to the synthetic creature 10.

The inventors' approach further uses calculation of joint 28 interaction forces at each time step. These may be directly computed from the interacting joint 28 states by using state velocities. However, it should be appreciated that conventional control rules may be used quite straightforwardly for this portion of the inventive approach. A variety of joint 28 types for handling varying levels of interaction forces may be implemented, to address a range of needs varying in complexity and computational burden, thus permitting simpler joint 28 types to be applied where sufficient.

Yet another key aspect of the inventors' approach is association of each joint 28 with a child link 32 in a hierarchical arrangement terminating with one non-associated link 30 not having a joint 28 associated with it. This provides a notational convenience, with the advantage that there is no longer any problem defining a base link, nor is there any need to explicitly compute the group center-of-mass or perform other unwieldy calculations during a simulation of a synthetic creature 10. Using ordinary object-oriented programming techniques, specialized links 26 can be formed which are massless or which have other special properties, thereby simplifying computation without introducing instabilities.

Equations used by the inventors to perform the above calculations for mass properties of connected rigid links are presented below:

Change of coordinates for velocity and force terms in a rigid link:

Impart acceleration $\dot{v}_0$ and rotational acceleration $\dot{\omega}_0$ on an object rotating at $\omega$. The kinematic constraint means that at point a in the object, the local acceleration $\dot{\omega}_a$ and angular acceleration $\dot{\omega}_a$ are, $$\dot{v}_a = \dot{v}_0 + \dot{\omega}_0 \times a + \omega \times (\omega \times a); \quad \dot{\omega}_a = \dot{\omega}_0$$

By defining a matrix, $$R(a) \equiv \begin{bmatrix} 0 & -a_z & a_y \\ a_z & 0 & -a_x \\ -a_y & a_x & 0 \end{bmatrix}$$

which has the properties, $$R(-a) = -R(a) = R^T(a)$$

we can express cross products as matrix products through the following identities, i.e.

$$a \times b = R(a)b = R^T(b)a = -R(b)a = R(-b)a = -b \times a$$

This allows us to use column vectors for all quantities, including expressions involving cross products. The acceleration equations can then be written, $$\begin{bmatrix} \dot{v}_a \\ \dot{\omega}_a \end{bmatrix} = \begin{bmatrix} 1 & R^T(a) \\ 0 & 1 \end{bmatrix} \begin{bmatrix} \dot{v}_0 \\ \dot{\omega}_0 \end{bmatrix} + \begin{bmatrix} \omega \times (\omega \times a) \\ 0 \end{bmatrix}$$

which can be inverted to provide the reverse transformation $$\begin{bmatrix} \dot{v}_0 \\ \dot{\omega}_0 \end{bmatrix} = \begin{bmatrix} 1 & R(a) \\ 0 & 1 \end{bmatrix} \begin{bmatrix} \dot{v}_a \\ \dot{\omega}_a \end{bmatrix} + \begin{bmatrix} \omega \times (\omega \times -a) \\ 0 \end{bmatrix}$$

A force $F_a$ and torque $T_a$ acting at a is equivalent to a force $F_0$ and torque $T_0$ acting at the center of gravity according to $$F_0 = F_a; \quad T_0 = T_a + a \times F_a$$

so that the following transformation of coordinates can be used regarding force and torque $$\begin{bmatrix} F_0 \\ T_0 \end{bmatrix} = \begin{bmatrix} 1 & 0 \\ R(a) & 1 \end{bmatrix} \begin{bmatrix} F_a \\ T_a \end{bmatrix}; \quad \begin{bmatrix} F_a \\ T_a \end{bmatrix} = \begin{bmatrix} 1 & 0 \\ R^T(a) & 1 \end{bmatrix} \begin{bmatrix} F_0 \\ T_0 \end{bmatrix}$$

Reaction forces at a joint and their effects on the body dynamics:

Suppose at joint a there is an external mass attached which has reaction forces as a function of the local linear and rotational acceleration expressed in local body coordinates conforming to the equation, $$\begin{bmatrix} F_a \\ T_a \end{bmatrix} = [M_a] \begin{bmatrix} \dot{v}_a \\ \dot{\omega}_a \end{bmatrix} + \begin{bmatrix} f_{0a} \\ t_{0a} \end{bmatrix}$$

We first recognize the fundamental force and torque balance that must occur, expressed at the body center, $$\epsilon F = m_0 \dot{v}_0$$

and $$\epsilon T = I_0 \dot{\omega}_0$$

then expand all terms and convert all coordinates to local body centered coordinates according to the transformations above, and solve for the force and torque that must act on the body center as a function of the body centered linear and rotation accelerations, as follows $$\begin{bmatrix} F_0 \\ T_0 \end{bmatrix} = \begin{bmatrix} m_0 & 0 \\ 0 & I_0 \end{bmatrix} \begin{bmatrix} \dot{v}_0 \\ \dot{\omega}_0 \end{bmatrix} + \begin{bmatrix} 1 & 0 \\ R(a) & 1 \end{bmatrix} \begin{bmatrix} F_a \\ T_a \end{bmatrix}$$

$$\begin{bmatrix} F_0 \\ T_0 \end{bmatrix} = \begin{bmatrix} m_0 & 0 \\ 0 & I_0 \end{bmatrix} \begin{bmatrix} \dot{v}_0 \\ \dot{\omega}_0 \end{bmatrix} + \begin{bmatrix} 1 & 0 \\ R(a) & 1 \end{bmatrix} [M_a] \begin{bmatrix} \dot{v}_a \\ \dot{\omega}_a \end{bmatrix} + \begin{bmatrix} 1 & 0 \\ R(a) & 1 \end{bmatrix} \begin{bmatrix} f_{0a} \\ t_{0a} \end{bmatrix}$$

$$\begin{bmatrix} F_0 \\ T_0 \end{bmatrix} = \begin{bmatrix} m_0 & 0 \\ 0 & I_0 \end{bmatrix} \begin{bmatrix} \dot{v}_0 \\ \dot{\omega}_0 \end{bmatrix} + \begin{bmatrix} 1 & 0 \\ R(a) & 1 \end{bmatrix} [M_a] + \begin{bmatrix} 1 & R(a) \\ 0 & 1 \end{bmatrix} \begin{bmatrix} \dot{v}_0 \\ \dot{\omega}_0 \end{bmatrix} + \begin{bmatrix} 1 & 0 \\ R(a) & 1 \end{bmatrix} [M_a] \begin{bmatrix} \omega \times (\omega \times a) \\ 0 \end{bmatrix} + \begin{bmatrix} 1 & 0 \\ R(a) & 1 \end{bmatrix} \begin{bmatrix} f_{0a} \\ t_{0a} \end{bmatrix}$$

Combining terms yields the force-acceleration relationship at the body center $$\begin{bmatrix} F_0 \\ T_0 \end{bmatrix} = \left( \begin{bmatrix} m_0 & 0 \\ 0 & I_0 \end{bmatrix} + \begin{bmatrix} 1 & 0 \\ R(a) & 1 \end{bmatrix} [M_a] \begin{bmatrix} 1 & R^T(a) \\ 0 & 1 \end{bmatrix} \right) \begin{bmatrix} \dot{v}_0 \\ \dot{\omega}_0 \end{bmatrix} +$$
$$\begin{bmatrix} 1 & 0 \\ R(a) & 1 \end{bmatrix} \left( [M_a] \begin{bmatrix} \omega \times (\omega \times a) \\ 0 \end{bmatrix} + \begin{bmatrix} f_{0a} \\ t_{0a} \end{bmatrix} \right)$$

Generalizing, we can say the effective mass-torque relations at the object center are governed by, $$\begin{bmatrix} F_0 \\ T_0 \end{bmatrix} = [M_0] \begin{bmatrix} \dot{v}_0 \\ \dot{\omega}_0 \end{bmatrix} + \begin{bmatrix} f_{00} \\ t_{00} \end{bmatrix}$$

where $$[M_0] = \begin{bmatrix} m_0 & 0 \\ 0 & I_0 \end{bmatrix} + \sum_i \begin{bmatrix} 1 & 0 \\ R(a_i) & 1 \end{bmatrix} [M_{a_i}] \begin{bmatrix} 1 & R^T(a_i) \\ 0 & 1 \end{bmatrix}$$

$$\begin{bmatrix} f_{00} \\ t_{00} \end{bmatrix} = \sum_i \begin{bmatrix} 1 & 0 \\ R(a_i) & 1 \end{bmatrix} \left( [M_{a_i}] \begin{bmatrix} \omega \times (\omega \times a_i) \\ 0 \end{bmatrix} + \begin{bmatrix} f_{0a_i} \\ t_{0a_i} \end{bmatrix} \right)$$

Change of coordinates for basic mass parameters:

The frame in which the mass parameters are computed can be converted to a different body frame by substituting the change of coordinates already provided, so that if the mass parameters are known at one point in the rigid body, they can be computed for another point as follows:

$$\begin{bmatrix} F_0 \\ T_0 \end{bmatrix} = [M_0] \begin{bmatrix} \dot{v}_0 \\ \dot{\omega}_0 \end{bmatrix} + \begin{bmatrix} f_{00} \\ t_{00} \end{bmatrix}$$

$$\begin{bmatrix} 1 & 0 \\ R^T(a) & 1 \end{bmatrix} \begin{bmatrix} F_a \\ T_a \end{bmatrix} = [M_0] \left( \begin{bmatrix} 1 & R(a) \\ 0 & 1 \end{bmatrix} \begin{bmatrix} \dot{v}_a \\ \dot{\omega}_a \end{bmatrix} + \begin{bmatrix} \omega \times (\omega \times -a) \\ 0 \end{bmatrix} \right) + \begin{bmatrix} f_{00} \\ t_{00} \end{bmatrix}$$

$$\begin{bmatrix} F_a \\ T_a \end{bmatrix} = \begin{bmatrix} 1 & 0 \\ R(a) & 1 \end{bmatrix} [M_0] \begin{bmatrix} 1 & R(a) \\ 0 & 1 \end{bmatrix} \begin{bmatrix} \dot{v}_a \\ \dot{\omega}_a \end{bmatrix} +$$
$$\begin{bmatrix} 1 & 0 \\ R(a) & 1 \end{bmatrix} [M_0] \begin{bmatrix} \omega \times (\omega \times -a) \\ 0 \end{bmatrix} + \begin{bmatrix} f_{00} \\ t_{00} \end{bmatrix}$$

So that we can say in general a change of coordinates yields a change in the mass parameters as follows, $$[M_a] = \begin{bmatrix} 1 & 0 \\ R(a) & 1 \end{bmatrix} [M_0] \begin{bmatrix} 1 & R(a) \\ 0 & 1 \end{bmatrix} \begin{bmatrix} \dot{v}_a \\ \dot{\omega}_a \end{bmatrix}$$

$$\begin{bmatrix} f_{0a} \\ t_{0a} \end{bmatrix} = \begin{bmatrix} 1 & 0 \\ R(a) & 1 \end{bmatrix} [M_0] \begin{bmatrix} -R^2(\omega)a \\ 0 \end{bmatrix} + \begin{bmatrix} f_{00} \\ t_{00} \end{bmatrix}$$

The same kind of derivation can be carried out for a rotational transformation of coordinates represented by a rotational transformation matrix, C, as follows. C is the matrix talking coordinates in frame c to some base frame 0, so that the basic transformational rules for a rotation in matrix form $$\begin{bmatrix} F_0 \\ T_0 \end{bmatrix} = \begin{bmatrix} C & 0 \\ 0 & C \end{bmatrix} \begin{bmatrix} F_c \\ T_c \end{bmatrix}; \quad \begin{bmatrix} F_c \\ T_c \end{bmatrix} = \begin{bmatrix} C^T & 0 \\ 0 & C^T \end{bmatrix} \begin{bmatrix} F_0 \\ T_0 \end{bmatrix}$$

$$\begin{bmatrix} \dot{v}_0 \\ \dot{\omega}_0 \end{bmatrix} = \begin{bmatrix} C & 0 \\ 0 & C \end{bmatrix} \begin{bmatrix} \dot{v}_c \\ \dot{\omega}_c \end{bmatrix}; \quad \begin{bmatrix} \dot{v}_c \\ \dot{\omega}_c \end{bmatrix} = \begin{bmatrix} C^T & 0 \\ 0 & C^T \end{bmatrix} \begin{bmatrix} \dot{v}_0 \\ \dot{\omega}_0 \end{bmatrix}$$

Then perform a similar manipulation f $$\begin{bmatrix} F_0 \\ T_0 \end{bmatrix} = [M_0] \begin{bmatrix} \dot{v}_0 \\ \dot{\omega}_0 \end{bmatrix} + \begin{bmatrix} f_{00} \\ t_{00} \end{bmatrix}$$

$$\begin{bmatrix} C & 0 \\ 0 & C \end{bmatrix} \begin{bmatrix} F_c \\ T_c \end{bmatrix} = [M_0] \begin{bmatrix} C & 0 \\ 0 & C \end{bmatrix} \begin{bmatrix} F_c \\ T_c \end{bmatrix} + \begin{bmatrix} f_{00} \\ t_{00} \end{bmatrix}$$

$$\begin{bmatrix} F_c \\ T_c \end{bmatrix} = \begin{bmatrix} C^T & 0 \\ 0 & C^T \end{bmatrix} [M_0] \begin{bmatrix} C & 0 \\ 0 & C \end{bmatrix} \begin{bmatrix} F_c \\ T_c \end{bmatrix} + \begin{bmatrix} C^T & 0 \\ 0 & C^T \end{bmatrix} \begin{bmatrix} f_{00} \\ t_{00} \end{bmatrix}$$

so that the mass parameters transform as follows:

$$[M_c] = \begin{bmatrix} C^T & 0 \\ 0 & C^T \end{bmatrix} [M_0] \begin{bmatrix} C & 0 \\ 0 & C \end{bmatrix}; \quad \begin{bmatrix} f_{0c} \\ t_{0c} \end{bmatrix} = \begin{bmatrix} C^T & 0 \\ 0 & C^T \end{bmatrix} \begin{bmatrix} f_{00} \\ t_{00} \end{bmatrix}$$

Force, torque input at a point:

Suppose a force $F_a$ and torque $T_a$ act at a point a for a duration, dt. Then the change in body centered linear momentum $dP_0$ and body centered angular momentum, $dH_0$ will be given by, $$\begin{bmatrix} dP_0 \\ dH_0 \end{bmatrix} = \begin{bmatrix} F_0 \\ T_0 \end{bmatrix} dt$$

$$\begin{bmatrix} dP_0 \\ dH_0 \end{bmatrix} = \begin{bmatrix} 1 & 0 \\ R(a) & 1 \end{bmatrix} \begin{bmatrix} F_a \\ T_a \end{bmatrix} dt$$

Velocity delta input at a point:

Suppose the environment imposes a instantaneous change in the velocity at a point of $dv_a$ and $d\omega_a$. Then the change in body centered linear momentum, $dP_0$ and body centered angular momentum, $dH_0$ will be given as follows. First rewrite the basic mass equation at a point so that $$\begin{bmatrix} F_a \\ T_a \end{bmatrix} dt = [M_a] \begin{bmatrix} dv_a \\ d\omega_a \end{bmatrix} + \begin{bmatrix} f_{0a} \\ t_{0a} \end{bmatrix} dt$$

This can be used in the basic momentum equation, above, so that $$\begin{bmatrix} dP_0 \\ dH_0 \end{bmatrix} = \begin{bmatrix} 1 & 0 \\ R(a) & 1 \end{bmatrix} \begin{bmatrix} F_a \\ T_a \end{bmatrix} dt$$

$$\begin{bmatrix} dP_0 \\ dH_0 \end{bmatrix} = \begin{bmatrix} 1 & 0 \\ R(a) & 1 \end{bmatrix} [M_a] \begin{bmatrix} dv_a \\ d\omega_a \end{bmatrix} + \begin{bmatrix} 1 & 0 \\ R(a) & 1 \end{bmatrix} \begin{bmatrix} f_{0a} \\ t_{0a} \end{bmatrix} dt$$

Taking the limit as dt→0 yields, $$\begin{bmatrix} dP_0 \\ dH_0 \end{bmatrix} = \begin{bmatrix} 1 & 0 \\ R(a) & 1 \end{bmatrix} [M_a] \begin{bmatrix} dv_a \\ d\omega_a \end{bmatrix}$$

Velocity delta plus zero torque input at a point:

When the input is linear velocity and there is no torque in the interface, the equations must be rewritten to solve for force and angular acceleration in terms of linear acceleration and torque, then converted to changes in momentum at the object center. To do this, break down the mass parameter matrix $M_O$ into parts, i.e.

$$\begin{bmatrix} F_a \\ T_a \end{bmatrix} dt = \begin{bmatrix} M_{a11} & M_{a12} \\ M_{a21} & M_{a22} \end{bmatrix} \begin{bmatrix} dv_a \\ d\omega_a \end{bmatrix} + \begin{bmatrix} f_{0a} \\ t_{0a} \end{bmatrix} dt$$

Let the $f_{0a}dt$ and $t_{0a}dt$ go to zero, but $F_a dt$ and $T_a dt$ remain finite, the rearrange to get, $$\begin{bmatrix} 1 & -M_{a12} \\ 0 & -M_{a22} \end{bmatrix} \begin{bmatrix} F_a dt \\ d\omega_a \end{bmatrix} = \begin{bmatrix} M_{a11} & 0 \\ M_{a21} & -1 \end{bmatrix} \begin{bmatrix} dv_a \\ T_a dt \end{bmatrix}$$

Invert the first matrix and multiply on both sides to get, $$\begin{bmatrix} F_a dt \\ d\omega_a \end{bmatrix} = \begin{bmatrix} 1 & -M_{a12}M_{a22}^{-1} \\ 0 & -M_{a22}^{-1} \end{bmatrix} \begin{bmatrix} M_{a11} & 0 \\ M_{a21} & -1 \end{bmatrix} \begin{bmatrix} dv_a \\ T_a dt \end{bmatrix}$$

$$\begin{bmatrix} F_a dt \\ d\omega_a \end{bmatrix} = \begin{bmatrix} M_{a11} - M_{a12}M_{a22}^{-1}M_{a21} & M_{a12}M_{a22}^{-1} \\ -M_{a22}^{-1}M_{a21} & M_{a22}^{-1} \end{bmatrix} \begin{bmatrix} dv_a \\ T_a dt \end{bmatrix}$$

Pull out the terms that are needed and transform to body centered coordinates to get, $$\begin{bmatrix} dP_0 \\ dH_0 \end{bmatrix} = \begin{bmatrix} 1 & 0 \\ R(a) & 1 \end{bmatrix} \begin{bmatrix} M_{a11} & M_{a12} \\ M_{a21} & M_{a22} \end{bmatrix} \begin{bmatrix} 1 & 0 \\ -M_{a22}^{-1}M_{a21} & M_{a22}^{-1} \end{bmatrix} \begin{bmatrix} dv_a \\ T_a dt \end{bmatrix}$$

$$\begin{bmatrix} dP_0 \\ dH_0 \end{bmatrix} = \begin{bmatrix} 1 & 0 \\ R(a) & 1 \end{bmatrix} \begin{bmatrix} M_{a11} - M_{a12}M_{a22}^{-1}M_{a21} & M_{a12} \\ 0 & 1 \end{bmatrix} \begin{bmatrix} dv_a \\ T_a dt \end{bmatrix}$$

which, when $T_a dt$ is zero, has the simple representation, $$\begin{bmatrix} dP_0 \\ dH_0 \end{bmatrix} = \begin{bmatrix} 1 \\ R(a) \end{bmatrix} [M_{a11} - M_{a12}M_{a22}^{-1}M_{a21}][dv_a]$$

For a single link with no other connections, we have $$[M_a] = \begin{bmatrix} m_0 & m_0 R(a) \\ R(a)m_0 & I_0 \end{bmatrix}$$

so that $$\begin{bmatrix} dP_0 \\ dH_0 \end{bmatrix} = \begin{bmatrix} 1 \\ R(a) \end{bmatrix} [m_0 - m_0 R(a) I_0^{-1} R(a) m_0][dv_a]$$

$$\begin{bmatrix} dP_0 \\ dH_0 \end{bmatrix} = \begin{bmatrix} 1 \\ R(a) \end{bmatrix} [m_0 + (R(a)m_0)^T I_0^{-1} (R(a)m_0)][dv_a]$$

Reverting back to cross product notation, this is, $$\begin{bmatrix} dP_0 \\ dH_0 \end{bmatrix} = \begin{bmatrix} m_0(dv_a + m_0(a \times (I_0^{-1} \otimes (a \times dv_a)))) \\ a \times m_0(dv_a + m_0(a \times (I_0^{-1} \otimes (a \times dv_a)))) \end{bmatrix}$$

PID control of massy link in one degree of freedom:
Equations of motion for simple mass with PID control are, $$\dot{p} = x;\ \dot{x} = v;\ \dot{v} = \frac{1}{m}\sum f = \frac{1}{m}(g - av - bx - cp)$$

where x is a position, v is a velocity, and p is an integral-error term. Here, g is an external input force. The values a, b, and c represent the controller, and are chosen to provide a desired closed-loop response of the system.

The transfer function for this system is, $$\frac{P(s)}{G(s)} = \frac{1/m}{s^3 + \frac{a}{m}s^2 + \frac{b}{m}s + \frac{c}{m}}$$

with s representing the Laplacian operator, d/dt. By choosing a, b, and c as follows, $$a = 3m/\tau;\ b = 3m/\tau^2;\ c = m/\tau^3$$

the system will have three real roots at $s = -1/\tau$ so that the general solution in terms of p will be, $$p(t) = Ae^{-t/\tau} + Bte^{-t/\tau} + Ct^2 e^{-t/\tau}$$

Notation is simplified by introducing a variable u, so that the other state variables can be computed as derivatives of the above equation to get the solution at a time, t, $$u = e^{-t/\tau}$$

$$p(t) = Au + Btu + Ct^2 u$$

$$x(t) = -Au/\tau + Bu - Btu/\tau + 2Ctu - Ct^2 u/\tau$$

$$v(t) = Au/\tau^2 - 2Bu/\tau + Btu/\tau^2 + 2Cu - 4Ctu/\tau + Ct^2 u/\tau^2$$

At t=0, the above equations reduce to, $$p(0) = A;\ x(0) = -A/\tau + B;\ v(0) = A/\tau^2 - 2B/\tau + Cr^2 u/\tau^2$$

From the above initial conditions, $p_0 = p(0), x_0 = x(0), v_0 = v(0)$, the particular solution has coefficients, $$A = p_0;\ B = p_0/\tau + x_0;\ C = -p_0/\tau^2 + x_0/\tau v_0/2$$

These can be substituted into the previous equations to compute the particular solution given arbitrary state and constant control coefficients. In particular, for large simulation time steps, the effects of a system under PID control can be simulated in closed form without loss of accuracy due to approximations.

Finally, it should further be appreciated that the inventive approach also facilitates more refined constructions, such as joints 28 that have limited movement, highly non-linear joints 28 such as the string relationships existing in puppets, very springy joints 28 for comic effects, and simple implementation of joints 28 having variable stiffness, as occurs when animals are in different states of arousal or motivation, or even joints whose control properties are defined by stochastic rather than deterministic functional relationships.

Buoyancy Control of Motion:
When trying to simulate quadrupeds such as dogs, cats, elephants, and so on, problems often arise because most of their mass is above their feet. For lifelike simulation of quadrupeds, it is necessary that the simulated synthetic creature 10 occasionally move through positions that are statically unstable, such as when running, etc. and, unfortunately, such simulated creatures have a tendency to fall down easily. This problem, of course, becomes even more pronounced when simulating humans and other bipeds.

The classical approach to overcoming this problem has been to use closed loop control of the entire system. First, the system must be instrumented sufficiently for all of the state variables to be "observable," to use the terminology of control systems theory. Generally, this requires at least one measurement for each state variable. In a simulation, these quantities are directly available, but for a modest synthetic creature 10 with, say, twenty one links 26 this will still be 126 variables (6×21=126) to be observed. These measurements will be combined according to a control rule to control each of the twenty joints 28, or 120 degrees of freedom. Because of the kinematic linkages involved, a linear control rule here is inadequate, and solving the problem in toto quickly becomes impractical using this approach.

To solve this problem the inventors have turned to human-factors engineering, where a model called the crossover model is used. The crossover model states that when a human being is part of a control loop, (e.g., when controlling a car or an airplane) he or she will behave so that the closed loop behavior of the system is stable and consistent, regardless of the fact that it is actually an open loop system being controlled, subject to such human limitations as reaction time, strength, and so on. By using this model in the control of individual limb segments, or in the control of a complete system such as an animal, the inventors are able to achieve stable, computable control without sacrificing realism. Stated simply, because a simulated dog synthetic creature 10 will behave as if its head link 34 is buoyant, it is a sufficient and compelling simulation to provide buoyancy in its head link 34 for purposes of simulation. (See e.g., negative weight 48 in FIG. 4.)

To do this, for each link 26 the inventors separate the components of mass and weight, and treat them separately. Often these two concepts are confused by lay people, and the English system of measurement is still confounded by the same name for gravitationally-induced weight (pound-weight) and the tendency to stay at rest or in motion (pound-mass). While the metric system separates these into the Newton and the kilogram, people commonly measure their weight in "kilograms" using an ordinary household scale. The ability to separate weight and mass is further obscured by the fact that everyday life contains few objects having positive mass and negative weight. For example, a helium balloon has these properties, but its mass is negligible, and people are surprised when a helium balloon in an accelerating bus moves forward due to its buoyancy relationship to the surrounding air.

In the inventors' approach to simulation, links 26 that are normally controlled to remain near the ground are given additional positive weight 46 (depicted by arrows), while links 26 controlled to remain high, such as the head link 34, are given negative weight 48 (also depicted by arrows). If the weight increments added and subtracted sum to zero, there will be no net weight added to the group of links 26, and their macroscopic behavior within the environment will remain realistic. Further, pairs of positive weight 46 and negative weight 48 can be added to the same link 26 to provide a torque-based buoyant property (see e.g., the head link 34 in FIG. 4). This is suitable, for example, for the control of the head link 34 of a synthetic creature 10, since most real animals would prefer, and are expected, to keep their head in an upright position, insofar as possible.

The Actions of a Synthetic Creature:

Actions 18 are primitives which a synthetic creature 10 is capable of. Major examples include movements 50 and noises 52, although other types of actions 18 are also possible (e.g., special communications, or appearances, such as the blush on the face of a clown synthetic creature 10 as it realizes it has done something embarrassing). A point to appreciate here is that categorizing specific actions 18 (e.g., whether a bark is a mere noise, or a message to stay away, or a message to come play) is not critically important. What is important is that authoring a collection of possible actions 18 for a synthetic creature 10 produces a library of useful primitives from which the more complex behaviors 20 may later be built.

In practice, most actions 18 are movements 50, sequences of poses 58 separated by step times 60 and governed by the character 16 and the universe 14. A pose 58 is a desired geometry of the links 26 and joints 28 of a synthetic creature 10. As a definitional convenience the inventors also treat single poses 58 as movements 50, and define the normal pose 59 of an action 18 as the pose 58 first dictated by the geometry of the character 16.

Figure 5:
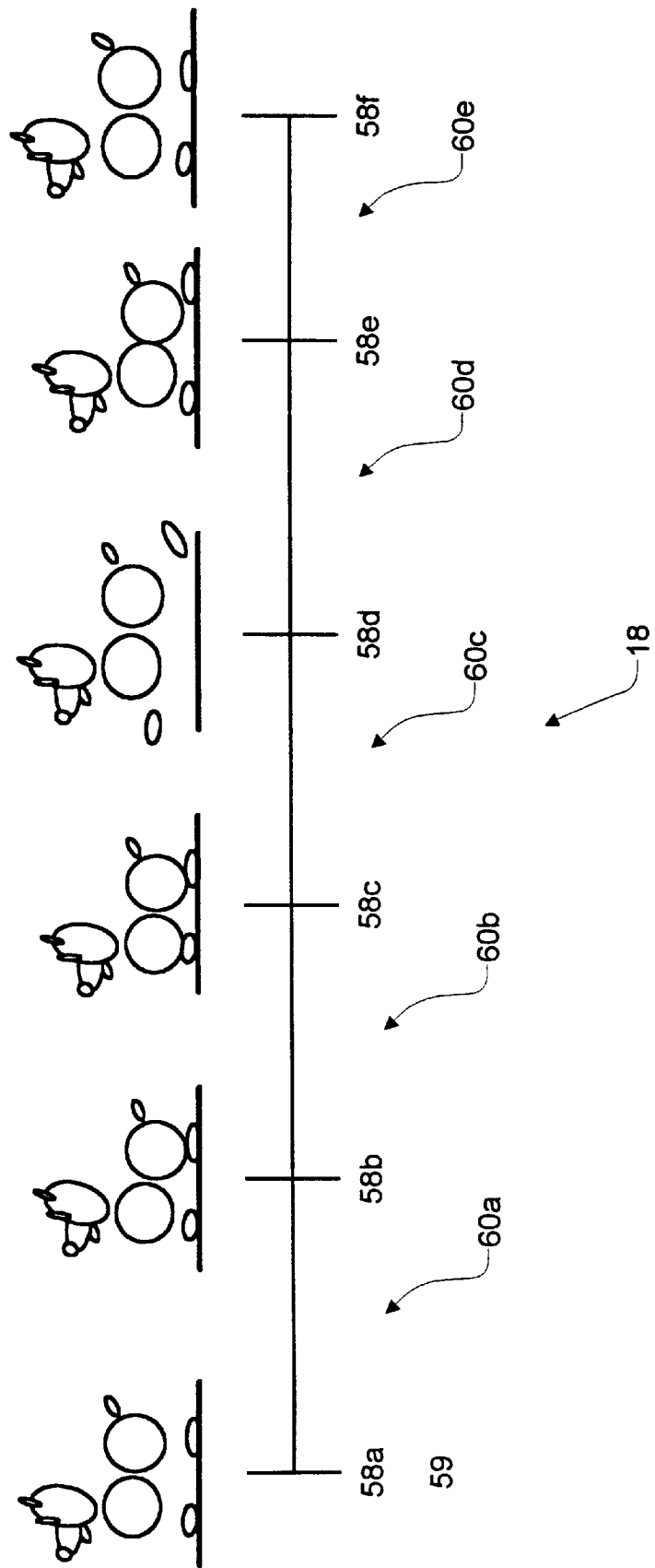
FIG. 5 is a stylized time line and image frame depiction of an action of a synthetic creature.

FIG. 5 is a stylized time-line and icon depiction of a typical dog synthetic creature 10 jumping. Pose0 58a is the synthetic creature 10 in a normal pose 59. After step0 60a the synthetic creature 10 is at pose1 58b, rocked back on its rear legs. After step1 60b the synthetic creature 10 is at pose2 58c, hunched down on its front legs. After step2 60c the synthetic creature 10 is at pose3 58d, all legs extended as it springs through the air. After step3 60d the synthetic creature 10 reaches pose4 58e, landing with all legs flexed slightly to absorb the impact. And, finally, after step4 60e the synthetic creature 10 reaches pose5 58f, a general finishing position (which might even be the same as normal pose 59 also, although many implementations will have a number of slightly different general poses 58, to enhance the lifelike appearance of the overall synthetic creature 10).

Noises 52 are another key type of action 18. An example of a noise 52 might be an "umh" as a dog synthetic creature 10 runs into something. Noises 52 are dealt with in the preferred embodiment by playback of pre-recorded sound files, which may be in conventional computer formats (e.g., WAV or MIDI type sound files).

The Behaviors of a Synthetic Creature:

Intelligent behaviors 20 for synthetic creatures 10 are created as sets of cooperating and competing processes, which give a feeling of autonomy and awareness, as well as properties such as graceful degradation and variability which are difficult to achieve using prior techniques. By using this approach, and particularly the other simulation described technologies herein, computation can be drastically reduced over current methods, making it possible for the first time to create a real-time simulation of a moderately complex animal using personal computers.

Behaviors 20 are how users ultimately perceive the composite activities of a synthetic creature 10. An example of a behavior 20 might be a synthetic creature 10 chasing a ball. Such a behavior 20 would encompass, at an abstracted level, actions 18 like running, turning, and barking, which themselves are an abstracted level above the character 16, which specifies such details as the range of motion of limbs and the springiness of joints (i.e., links 26 and joints 28).

To define the overall behavior 20 of a synthetic creature 10 (i.e., its brain) the inventors use a behavior tree 72 hierarchy of optionally recursive sub-behaviors 74 composed of behaviors 20 and actions 18 (see e.g., FIG. 18 and FIG. 19, discussed in detail under implementation below). The overall behavior 20 of a synthetic creature 10 is manifested by execution beginning at the root of the behavior tree 72, and progressing through branches until leafs are reached (i.e., ultimately actions 18). In the inventors' scheme sub-behaviors 74 are typed as sequential sub-behavior 76, parallel sub-behavior 78, decision sub-behavior 80, and interruptible sub-behavior 82. Of course, other types can be implemented, if desired, but conceptually all situations encountered to date seem to be addressable as tree branches composed recursively of these four types. For example, planning and recognition are implimentable as constructs using decision sub-behaviors 80. In particular, a synthetic creature 10 with extensive learning capabilities will in all likelihood require the ability to add or remove behaviors 20 to develop totally new behaviors 20 on its own (i.e., a form of learning).

Sequential sub-behaviors 76 are represented as ordered lists of sub-behaviors 74, which in turn may be other sub-behaviors 74. For sequential sub-behaviors 76 the order of the sub-behaviors 74 within the list determines the order of their execution. Parallel sub-behaviors 78 are representable as non-ordered (i.e., ordering is irrelevant) lists of sub-behaviors 74, where all of the branch sub-behaviors 74 in the list execute concurrently.

Decision sub-behaviors 80 are also representable as non-ordered lists, but lists of sub-behaviors 74 which each are initially (in the preferred embodiment) giving an equal weighting factor 88, and for which the weighting factor 88 may then be author adjusted. Upon beginning execution of a decision sub-behavior 80, a random selection is made based on a probability distribution given by the combination of the weighting factor 88 and evaluated to determine which sub-behavior 74 is executed. Using this very simple principle decision sub-behaviors 80 can accomplish quite complex results (e.g., personality). To appreciate this concept one need merely appreciate that reality is random and, accordingly, modeling reality requires some randomness as an input.

Interruptible sub-behaviors 82 are represented as a default sub-behavior 90 and an ordered list of paired key stimuli 92 and associated sub-behaviors 94. Upon beginning execution of an interruptible sub-behavior 82, all of the key stimuli 92 are evaluated and the first associated sub-behavior 94 having its corresponding key stimuli 92 set is executed. If no key stimuli 92 is set, the default sub-behavior 90 is executed.

An example of a partial behavior tree 72 for a cat synthetic creature 10, which illustrates sub-behaviors 74, might be:

```
Main behavior (interruptible)
    <null> Sleep (parallel)
    <roosterCrow> Wake (parallel)
        EyeBlinking (sequential)
        WakingActivity (interruptible)
            <null> WatchFish (sequential)
                GoToFishBowl (sequential)
                GazeAtFish (sequential)
                RespondToFish (decision)
                    BatAtBowl (sequential) [1]
                    DipInBowl (interruptible) [1]
            <nameCall> RespondToOwner (decision)
                GoToOwner (sequential) [5]
                WaitOwnerCome (parallel) [1]
                HideFromOwner (interruptible) [0.8]
            <mealCall> RunToKitchen (sequential)
```

In this example sub-behavior 74 types are noted in parentheses, key stimuli 92 are enclosed in "<" and ">" symbols (with "<null>" opposite each default sub-behavior 90), and values for weighting factors 88 are shown between square brackets. In the above example the decision sub-behavior 80 labeled "RespondToFish" has all equal weighting factors 88 for each sub-behavior 74, as if the default weighting factors 88 have not been adjusted. In contract, the decision sub-behavior 80 labeled "RespondToOwner" has different weighting factors 88 for each sub-behavior 74, to increase the probability that the sub-behavior 74 labeled "GoToOwner" will run, and to decrease the probability that the sub-behavior 74 labeled "HideFromOwner" will run (i.e., this cat type synthetic creature 10 has a random attitude problem as part of its "personality").

In the above examples, rudimentary personality traits for a synthetic creature 10 were illustrated. Much more complex personalities are easily implemented with decision sub-behaviors 80. For example, synthetic creatures 10 using the standard Myers-Briggs type personality preference variables to achieve very human like balances of extroversion vs. introversion, sensing vs. intuition, thinking vs. feeling, and judgment vs. perception. Further, it should now be readily apparent that other personality "engines" are also quite possible.

Process-based Intelligence.

While it is difficult to characterize current approaches to intelligence, an approach roughly equivalent to classical computer architecture may be useful for study. The simulated being is given a single, central controlling process, a set of tasks it can do, a stack frame, and a preemptive system for switching between tasks when new tasks come along. While this approach has merits, it also has limitations. First, such a system can only be doing one thing at a time, which results in a very computer-like appearance. Second, the system is subject to crashes. For example, when a single stack frame is out of order, all systems come to an immediate halt. Third, it is procedurally oriented, so it is difficult to impart high-level behaviors using these paradigms.

The inventors' approach avoids these problems by endowing the synthetic creature 10 with a set of independent behaviors 20 (i.e., processes; see e.g., FIG. 6 and FIG. 7) that interact to achieve particular goals. Further, these behaviors 20 may be freely started or ended by other behaviors 20, thus creating the recursive behavior tree 72 hierarchy structure of sub-behaviors 74 described above. For example, normally the function of an animal's body part depends upon the animal's behavior. At different times an animals head may be used for balance during walking, for gross pointing of the eyes when looking, or for communicating its wish for food or attention. In the inventors' approach, the independent behaviors 20 are used to control things such as head direction pointing, eye gaze, navigation, emotional state, and so on. By implementing intelligence in this way, the inventors achieve a kind of graceful degradation. When related behaviors 20 are missing because they have been destroyed or are not available yet, or are still in design and development, a specific behavior 20 can still operate to its new, limited, abilities. It has long been recognized that organic systems often have this property of graceful degradation, but it has been more difficult to achieve in mechanically based or artificial systems.

Variation is achieved when behaviors 20 can be started under some specific conditions, or different behaviors 20 are chosen at random to achieve the same goal, and under otherwise identical conditions.

By way of example, it is useful to study the interactions between gaze pointing, head pointing, and body positioning. Observing real animals shows us that when an interesting entity such as a fly is near the center of the visual field of a dog, say, then only the eyes are moved to view it. But, when the fly is farther afield, the head is also moved. And, when this is still not enough, the body is even moved, if necessary by first achieving a standing or sitting position.

In the typical computational approach to intelligence, to accomplish eye pointing one must simultaneously solve the problem of head pointing and body pointing. Further, when the animal is doing eye pointing, it will necessarily be doing head and body pointing as well. Also, typically, none of the eye pointing will be implemented and testable until all of the problem is solved.

Figure 6:
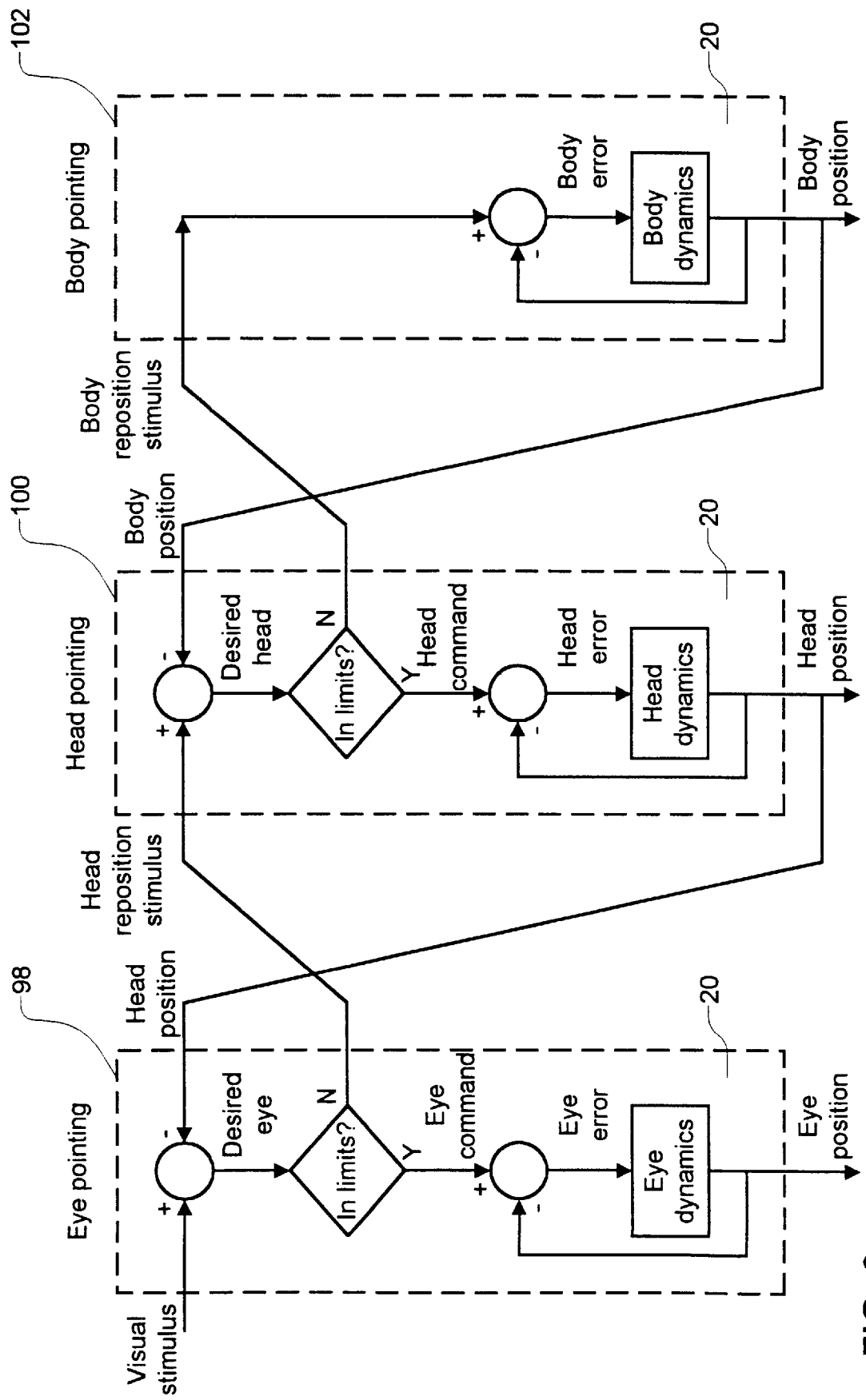
FIG. 6 is a flow chart depiction of eye-pointing implemented as a set of independent and autonomous behaviors.
Figure 7:
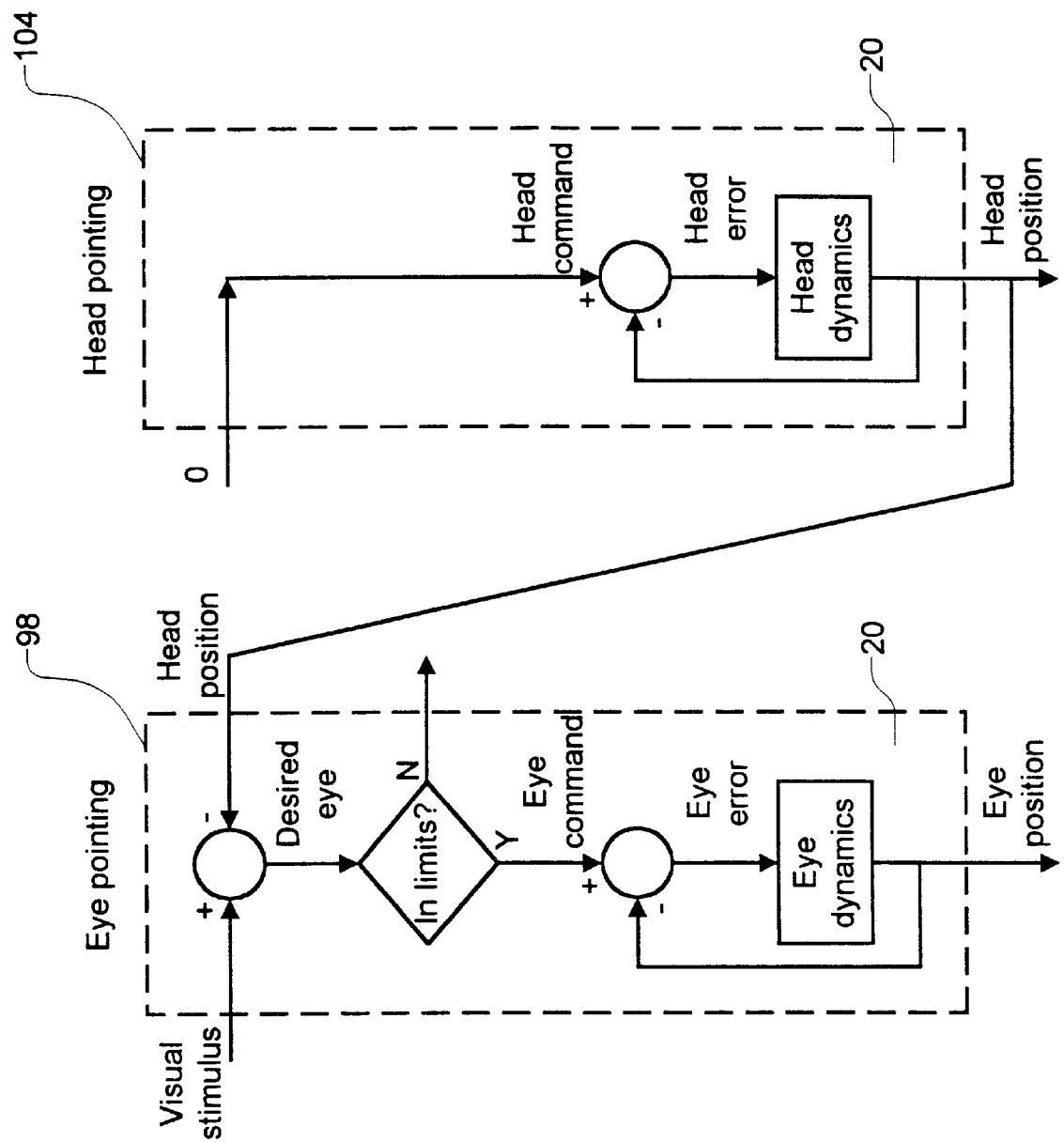
FIG. 7 is a flow chart depiction of graceful degradation, when one independent behavior is not fully implemented.

In the inventors' process-based approach, as depicted in FIG. 6, the eye pointing behavior 98 consists only of pointing the eye links 36 if possible, or pointing the head link 34 if the object being viewed is too far afield. No details of the head pointing behavior 100 or the body pointing behavior 102 are needed to implement the eye pointing behavior 98. During execution, the eye pointing behavior 98 proceeds whether the synthetic creature 10 is sitting or standing, walking or chasing, and there are no bottlenecks or processing conflicts to resolve. However, depicted in FIG. 7, if the head pointing behavior 100 is damaged or not finished yet (depicted as abnormal head pointing 104), the eye pointing behavior 98 can still function, or at least be tested. It should also be appreciated that this approach may be useful for other aspects of intelligence to be modeled.

Stimuli and Environment Variables:

In the present invention stimuli 62 and environment variables 64 are used to control run-time execution of the behavior tree 72 of behaviors 20. In programming terminology, stimuli 62 function as "flags" representing binary states such as true or false, on or off, etc. All stimuli 62 are associated with a world position 68, which identify where within the environment 22 they originate at run-time. An example is a synthetic creature 10 perceiving a ball being present (i.e., it is either true or false that a ball is present). Since a world position 68 is associated with the stimuli 62 of the ball being present, the synthetic creature 10 is accordingly able direct its attention and ultimately also its behaviors 20. In another example, a mouse click type stimuli 62 meaning to look at the user can have a user world position 68 (i.e., the screen or window into the synthetic creature's 10 world) for the synthetic creature 10 to turn toward.

In contrast, environment variables 64 are real number values which may further influence, dynamically at run-time, the likelihood that sub-behavior 74 which is part of a decision sub-behavior 80 will run (i.e., modifying the likelihood set during authoring by any weighting factor 88 applied by the author). An example of an environment variables 64 might be labeled "darkNight," and contain a real number value which is used to pass information about how dark the environment is to a decision sub-behavior 80 which controls a synthetic creature's 10 clumsiness.

The Environment of a Synthetic Creature:

Environments 22 are the particular physical and visual characteristics of surrounding space, including constraining surfaces such as floor and walls, distributed materials such as air and water, free fields such as gravity, and events such as a tree falling or an earthquake into which a synthetic creature 10 may be placed. Accordingly, environments 22 can become quite complex, although such complexity is not always necessary. In fact, in theory, a synthetic creature 10 may not have any environment 22, although such a synthetic creature 10 would probably not be very satisfying to users. Further, a synthetic creature 10 may be placed in or even travel through multiple environments 22. For example, one environment 22 might be authored to resemble a setting on earth, with a second to resemble a setting on the moon, these would be two valid environments 22 for a synthetic creature 10, as long as the same universe 14 is used.

Noted in FIG. 1, the major components of environments 22 include a visual backdrop 106, static objects 108, and dynamic objects 110. Of course, other components may easily be envisioned and implemented for use in environments 22, but only these few will be discussed here, to facilitate understanding of the inventive synthetic creature 10.

The visual backdrop 106 consists of a base surface 112 (e.g., ground if outside or a floor if inside a building) and a distance view 114, which may either be merely a 360 degree panorama visible horizontally (i.e., there is no "up" view), or a true hemispherical full sky view. In the preferred embodiment, pre-recorded bit-maps are used for the base surface 112 and the distance view 114.

Static objects 108 are distinct objects in the environment 22 which do not move. Examples include trees and walls. Static objects 108 require frequent calculation of a users view (i.e., is the static object 108 in front of or behind a synthetic creature 10, or a dynamic object 110 at any particular instance; resembling a sprite problem). Static objects 108 also require spatial conflict resolution, since a synthetic creature 10 or a dynamic objects 110 may move in front of or in back of but not right through a static object 108 like a tree.

Unfortunately, these requirements introduce considerable run-time computer system rendering overhead. Therefore, for a simple environment 22 it is often easiest to leave out static objects 108, and in some implementations the inventors have done exactly this, depicting a synthetic creature 10 only in an open park setting or on a beach (one without true wave action). Further, unfortunately, static objects 108 are often desired in relatively large numbers. For example, a forest, a maze, or a room full of pieces of furniture. Therefore, authors are often compelled to resort to visual tricks to limit the use of static objects 108, like putting all trees or furniture into the distance view 114, which the synthetic creature 10 then always passes in front of.

The inventors do not herein teach a direct solution to any of the above static object 108 problems, but it should be appreciated that use of the techniques taught herein to simulate efficient synthetic creatures 10 do free up run-time resources to be applied to this.

In contrast to static objects 108, dynamic objects 110 move about within environments 22. Some examples of dynamic objects 110 include toys for play, like balls, and other synthetic creatures 10. A synthetic creature 10 can play with a ball dynamic object 110 either on its own or with its user. It can nudge a ball into motion and chase it, running in front of and behind it as needed. Or it can chase a ball moved by a user (say by a mouse click on the ball and a drag-toss action). Similarly, a first synthetic creature 10 can interact with other synthetic creatures 10 in an environment 22. It should be noted that such multiple synthetic creature 10 interactions can be quite complex, for example involving not only positional messaging such s that of the chase-ball scenario, but also audible interaction, like barking or meowing, and even other types (e.g., odor interaction in a dog meets skunk scenario).

Dynamic objects 110 have the same closest-to-viewer and spatial-position-conflict concerns as static objects 108. However, dynamic objects 110 are usually inherently used sparingly. Since too many independently active elements in a scene confuse viewers, authors usually only desire a few key dynamic objects 110, to focus users view on the author's creative purpose. In most implementations to date, the inventors have not encountered a need for scenarios with more than two or three dynamic objects 110 at a time (however, this is not a limitation; larger numbers are certainly possible, if desired and where run-time resources can support them).

IMPLEMENTATION OF A SYNTHETIC CREATURE

The preceding section has dealt with the inventors' definition of a synthetic creature 10. Implementation of that definition requires tools, i.e., an authoring environment 200 (not shown), for authors to apply the definition when creating synthetic creatures 10 in computer readable format, and a run-time computer 202 (also not shown) upon which to ultimately present a finished synthetic creature 10 to viewers.

The Authoring Environment:

As noted previously, the inventors have found that considerable programming efficiency may be obtained by generally authoring in distinct layers 12 (FIG. 1). It therefore follows that distinct tools for each of the layers 12 are desirable (as contrasted to "required"; separation of tools is not absolutely necessary, and accordingly should not be regarded as a limitation on the true scope of the present invention). As illustrated in the various drawings, basic forms of the preferred embodiments of the tools are respectively depicted by the general reference character 204 for an optional universe editor (not shown); by the general reference character 206 for the inventive character editor (particularly shown in the views of FIG. 8 through FIG. 15c); the general reference character 208 for the inventive action editor (particularly shown in the views of FIG. 16 and FIG. 17); the general reference character 210 for the inventive behavior editor (particularly shown in the views of FIG. 18 through FIG. 21); and the general reference character 212 for the inventive environment editor (not shown).

The Optional Universe Editor:

As previously noted, the simplest way to author a universe 14 (FIG. 1) is to simply "hard code" a physics 24, (e.g., conventional "earth-normal" equations and coefficients) into the character 16 (more correctly, by integrating this ability into the character editor 206, so that the physics 24 becomes a part of each character 16 as it is authored). Rather than use a separate universe editor 204, that is what the inventors have done for all embodiments to date. However, it is but a small additional step to add a user interface to permit authors to change the physics 24 of the universe 14, say by entering non-Newtonian equations or non-earth normal coefficients (i.e., physical constants, say for gravity, friction, or elasticity of materials).

Authoring of such a universe 14 would include entering or selecting from among already stored physical constants 214 (e.g., for gravity, friction, etc.), and entering or modifying already stored standard equations 216 (e.g., Newton's equations of motion), which will together govern motion of any object (i.e., not just the synthetic creature 10) within that universe 14.

The Character Editor:

In the preferred embodiment, the first major authoring task is creation of a character 16 for the synthetic creature 10 (i.e., the three dimensional physical model for a synthetic creature 10, including shape, mechanics, and visual characteristics). This requires specifying characteristics of and relationships between links 26 (i.e., limbs) and joints 28. A tool is needed to author new characters 16, to edit existing characters 16, and to test characters 16, and in the preferred embodiment this role is filled by the character editor 206.

Figure 8:
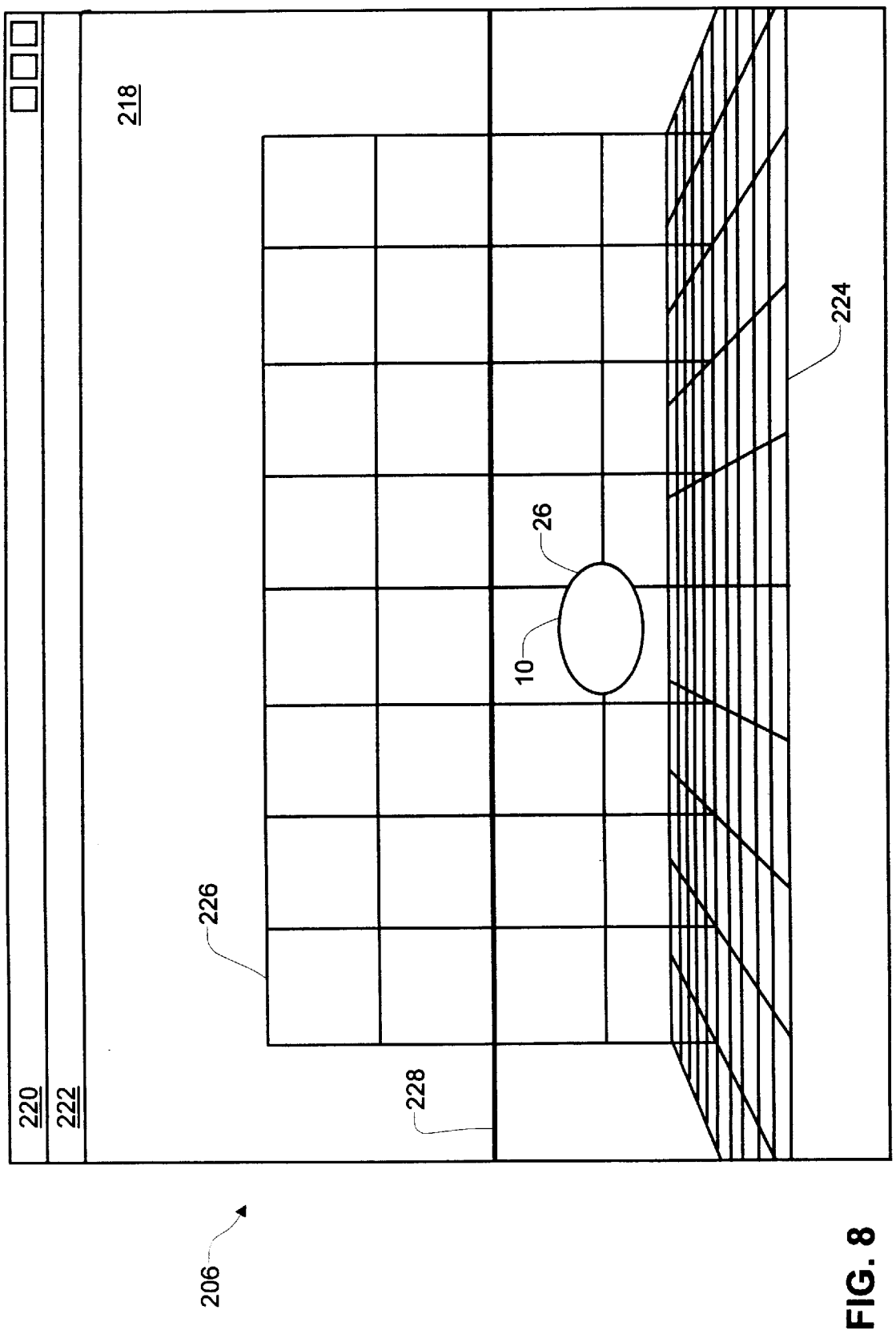
FIG. 8 is a screen capture of a typical character editor of the invention depicting starting of the creation of a synthetic creature.

FIG. 8 through FIG. 15c depict various screen-captures taken from a typical character editor 206 in use. Turning now particularly to FIG. 8, the character editor 206 presents an author with a character editor screen 218 which at its top includes an information bar 220 and a menu bar 222. A synthetic creature 10 is built up by entering link 26 and joint 28 associations centered in the character editor screen 218 above a floor grid 224 and initially centered on a vertical plane grid 226 with a horizon line 228 across the background. Further appearing when an existing link 26 is double-clicked on with a mouse or hot-key selected is a character properties window 230 (FIG. 9), which is author dragable anywhere within the character editor screen 218.

Figure 9:
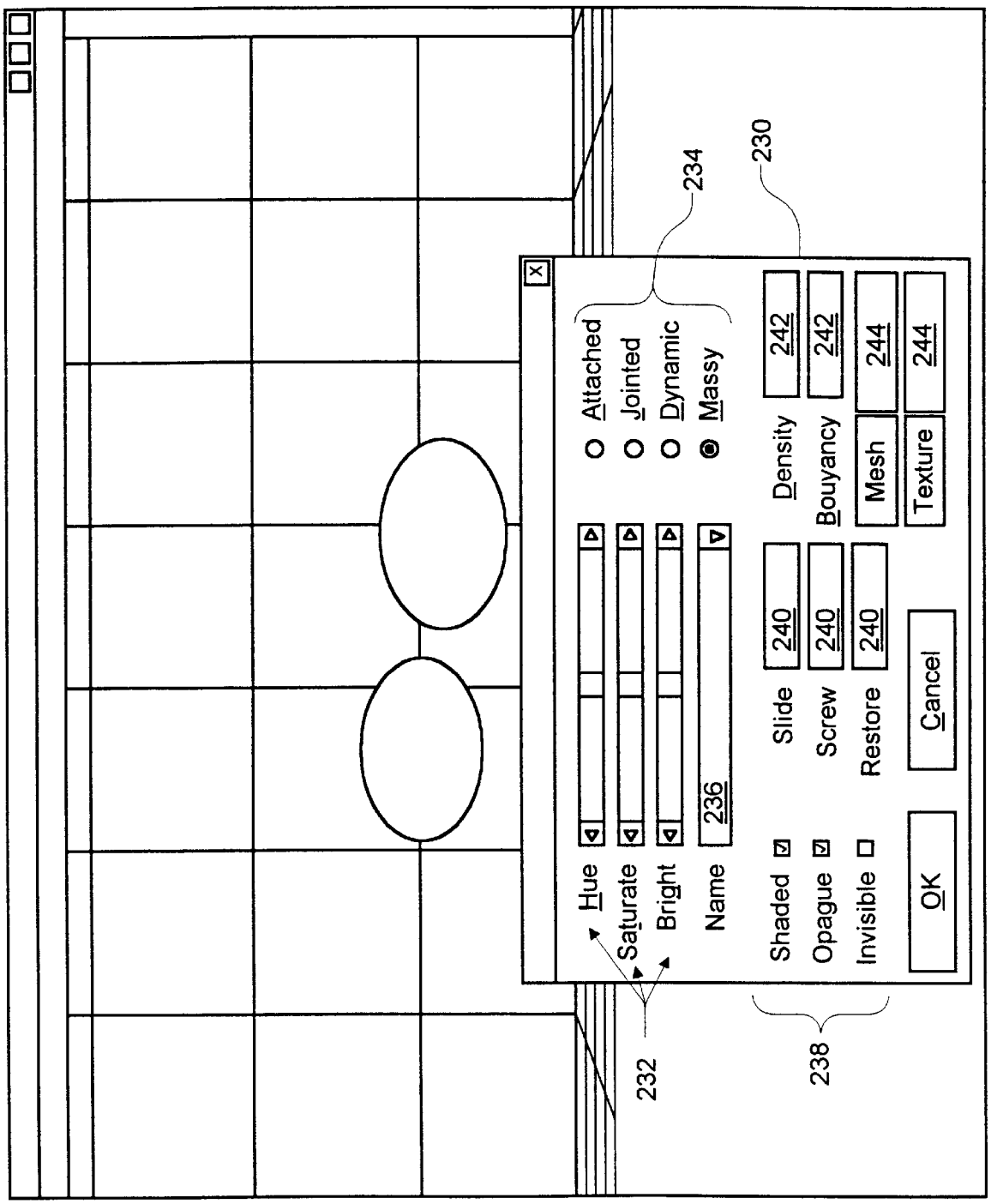
FIG. 9 is a screen capture depicting how properties of a link in a synthetic creature may be tailored in a character editor controls window.

FIG. 9 illustrates the major elements of the character properties window 230, including color properties sliders 232, a joint type button set 234, name line-list 236, visual characteristics checkboxes 238, joint characteristic lines 240, link physics characteristic lines 242, and link construction characteristic lines 244.

The color properties sliders 232 control hue, saturation, and brightness. Initial color selection is done with choices in the menu bar 222, or setting a default. Once a color is used for one link 26 the next link 26 created automatically has a slightly different color, to distinguish closely adjacent links 26. Color is freely further author changeable, via controls in the menu bar 222.

Figure 10:
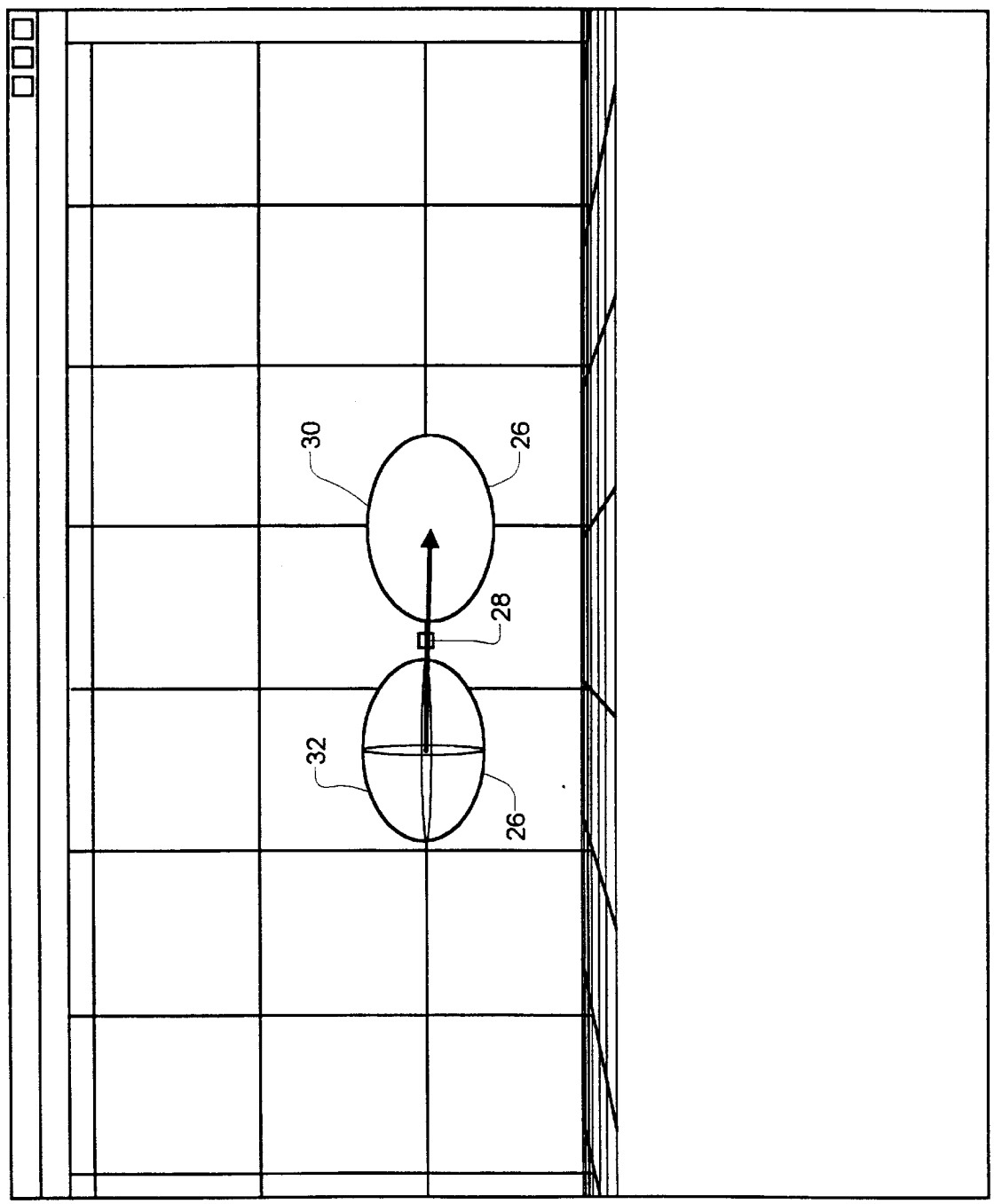
FIG. 10 is a screen capture depicting addition of link structure during continued authoring of the synthetic creature started in FIG. 8.

The joint type button set 234 provides author selection of mechanical types of links 26, including attached (i.e. rigidly connected to a higher order link 26 (e.g., the joint 28 joining a child link 32 to a non-associated link 30 in FIG. 10), jointed (positionably rotatable about one or more axis), dynamic (simulating basic movement), and massy (having fully modeled movement characteristics).

The name line-list 236 provides a drop-down selection list of common labels for body parts (e.g., head, left shoulder, etc.), but with author ability to add new labels. The use of standardized labels, preferably conventional ones, permits reusability and portability of authoring work product across the layers 12. For example, cat synthetic creature 10 type actions 18 and sub-behaviors 74 can be transferred to a dog synthetic creature 10 by using such common labels.

The visual characteristics checkboxes 238 permit selection of shaded, opaque, and invisible visual representation of a selected link 26. Note that these are representations of the links 26, not necessarily the ultimate visual characteristics which a user will see. Those may be modified by the texture 252 or by lighting provided in the environment 22 at run-time. In the inventors' preferred embodiment, such representations are used to specify some link 26 physical capabilities. Links 26 represented as visually shaded (see e.g., shade 246 in FIG. 14) also pass through one another. In contrast, opaque links 26 cast a visible shadow (see e.g., shadow 248 in FIG. 11) and can collide with other links 26 (i.e., be aware of other links 26, and not occupy the same space). Invisible type links 26 are not visible, making them useful to add hidden mechanical properties, and thus obtain often novel results.

The joint characteristic lines 240 provide control of slide speed (transitional movement speed of a link 26), screw speed (rotational movement speed of a link 26), and restore time of a link 26 (much like some conventional muscle structure has different speeds of extension and retraction; this is only made available for the massy link type). The link physics characteristic lines 242 control density and buoyancy of the selected link 26.

Figure 15A:
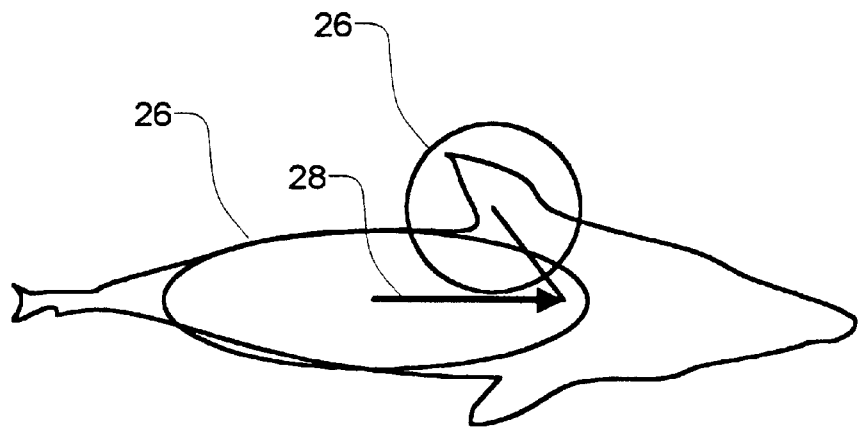
FIG. 15a, FIG. 15b, and FIG. 15c are screen captures a simulated dolphin, with FIG. 15a showing examples of some links emphasized in the dolphin as ellipsoids, with FIG. 15b showing the dolphin-like mesh structure emphasized in the dolphin, and with FIG. 15c showing the dolphin with a "skin" texture added.
Figure 15B:
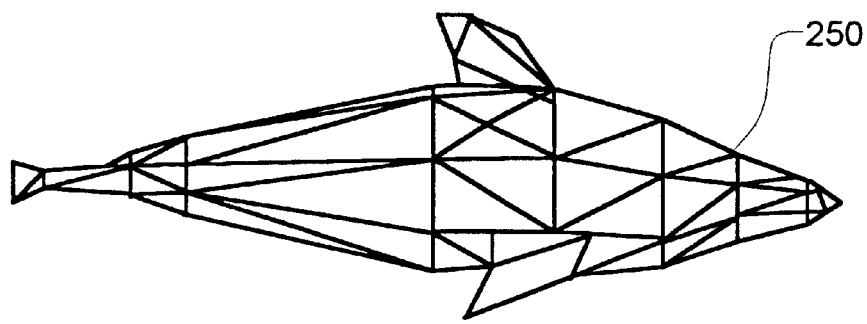
Figure 15C:
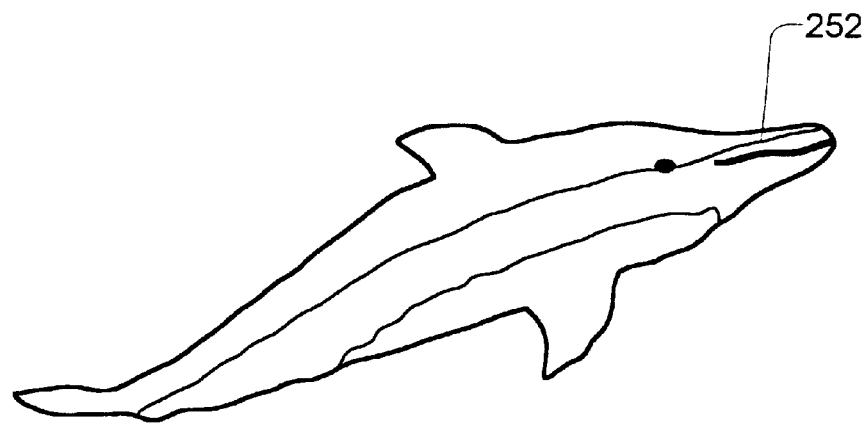

The link construction characteristic lines 244 control mesh 250 and texture 252 of the link 26. The default mesh 250 of links 26 in the preferred embodiment is ellipsoid (see e.g., the visible mesh 250 in FIG. 15a). However, this is author changeable, say to trapezoidal, or dolphin shaped as is shown in FIG. 15b, and which underlies the example of texture 252 presented in FIG. 15c. Considerable structural shape variation is representable out of conventional mesh type constructs, and the present invention is fully capable of using such. (It should particularly be noted that while most examples presented in the figures use ellipsoids for simplicity, many implementations of synthetic creatures 10 will use more sophisticated mesh 250. Texture 252 is a conformal mapping over the surface of a link 26 (e.g., the bitmap "wrapped" over the dolphin synthetic creature 10 appearing in FIG. 15c). Texture 252 is quite useful for imparting a "skin" to a synthetic creature 10, and some sophisticated examples being fur and reptile scales. (Here also, few examples of texture 252 are present in the figures, but those skill in the relevant arts will readily see that the present invention is capable of very broad application of texture 252.)

Figure 11:
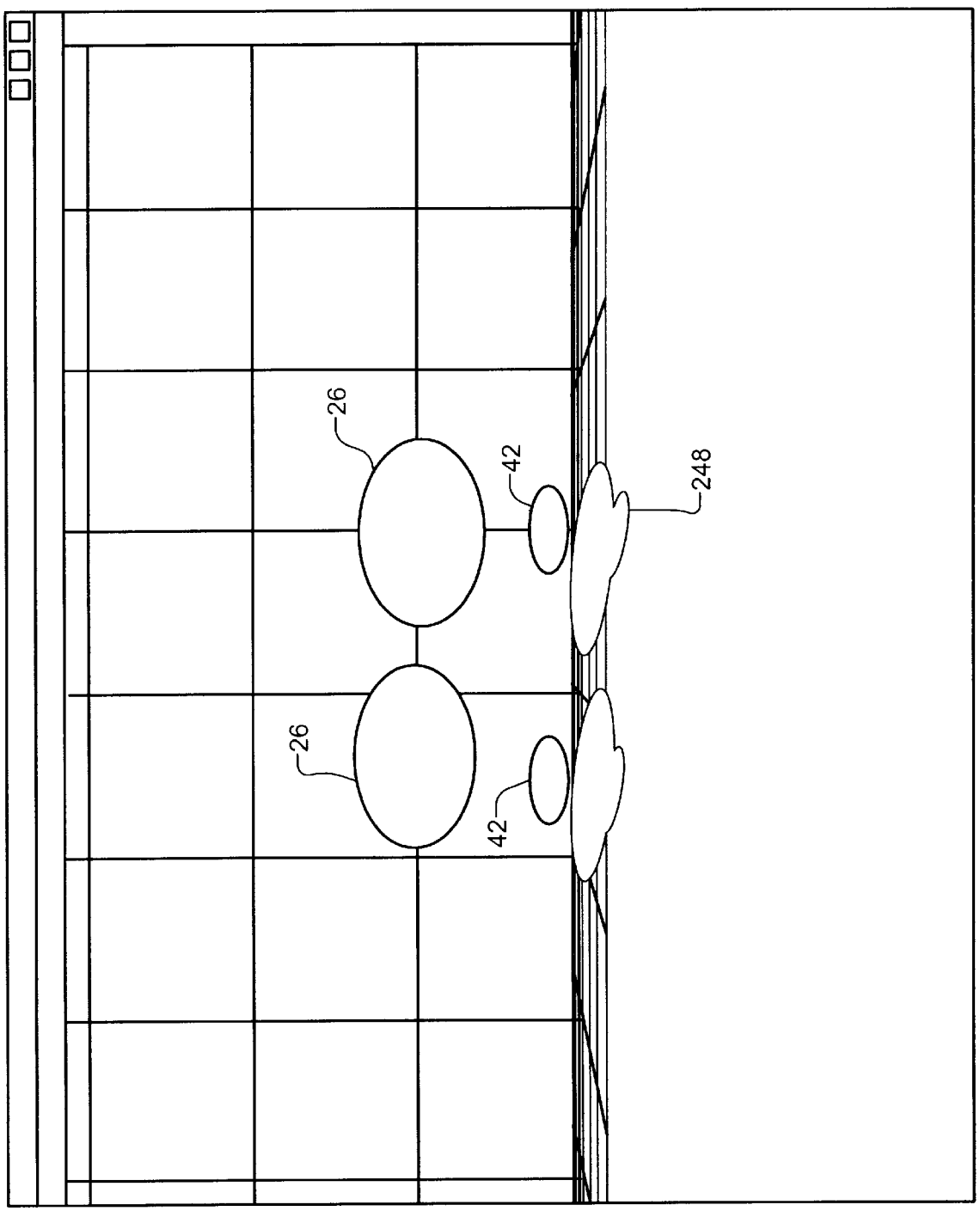
FIG. 11 is a screen capture depicting initial definition of symmetric structure to the synthetic creature.
Figure 12:
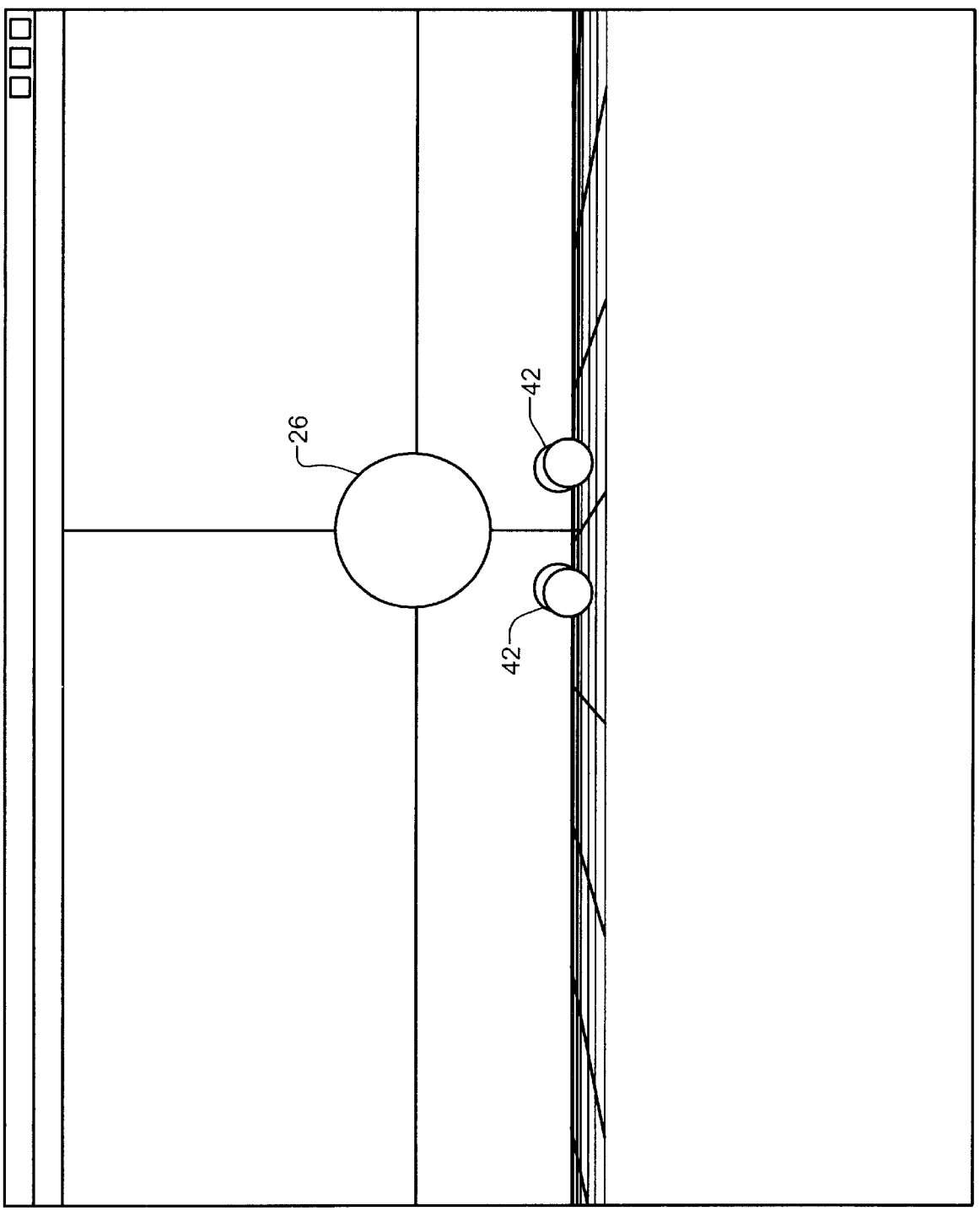
FIG. 12 is a screen capture depicting completion of the symmetric structure by mirrored copying of symmetric parts of the synthetic creature.
Figure 13:
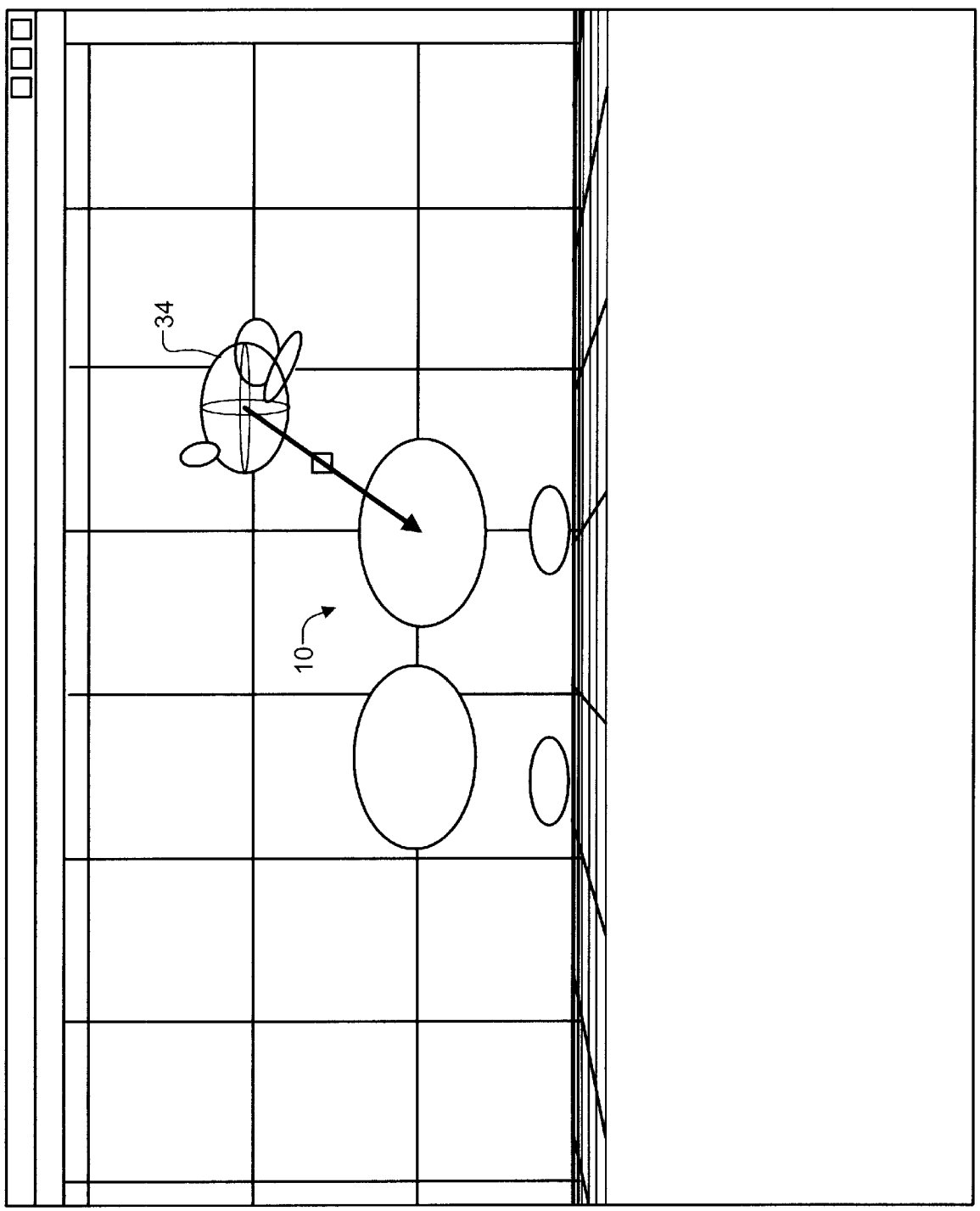
FIG. 13 is a screen capture depicting addition of additional major body links to the synthetic creature.
Figure 14:
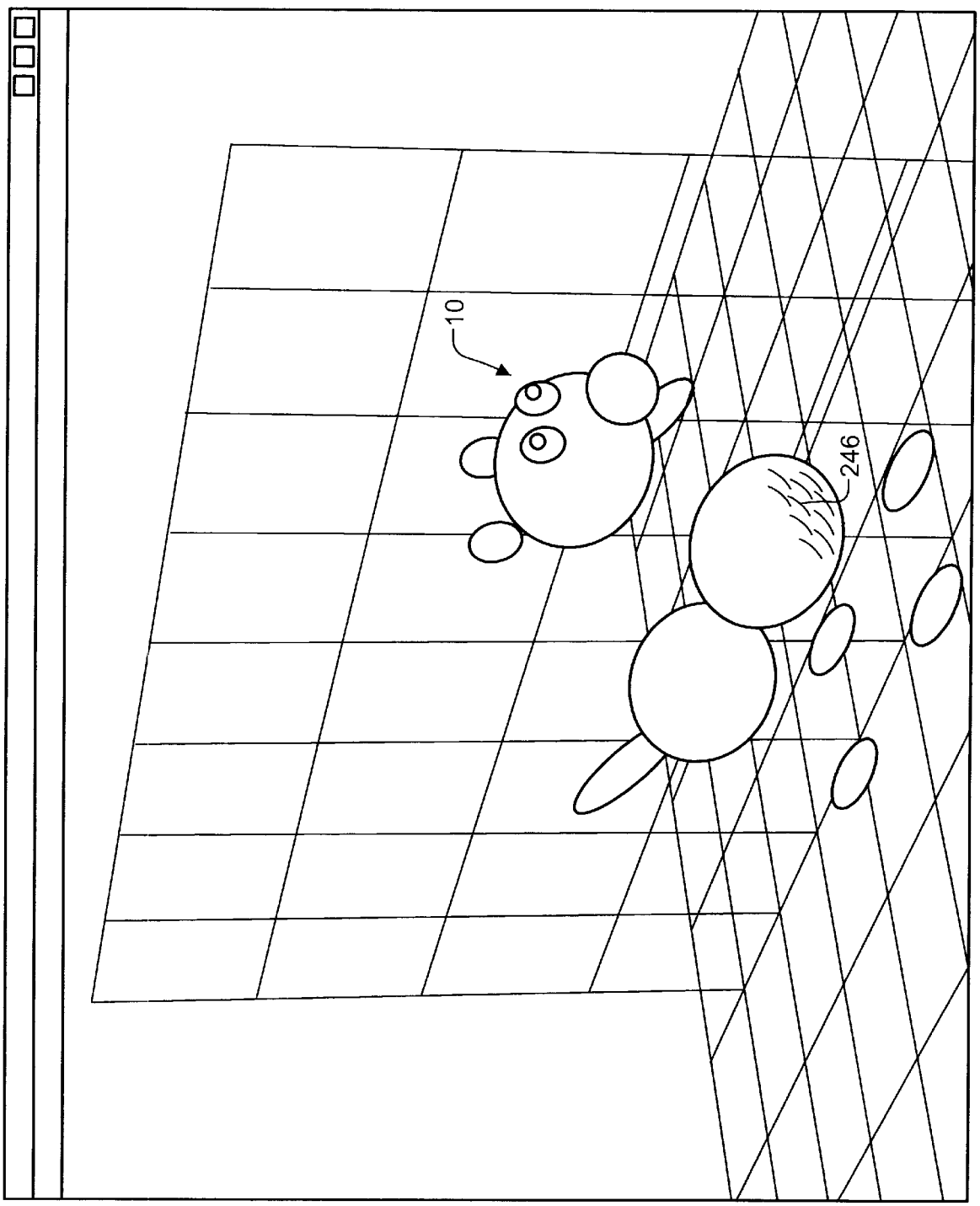
FIG. 14 is a screen capture depicting the structurally complete synthetic creature, now recognizable as a simulated dog and including the use of shading and shadow visual effects.

Many features of the preferred embodiment of the character editor 206 are accessed with hot-keys and click and drag mouse operations. For example, in FIG. 8 a user has clicked and dragged to size a link 26. In FIG. 10 a second link 26 has been added (both links 26 are shown as mere ovals here to emphasize the joint 28), and a double click and drag operation has been used to add a joint 28 between the links 26 (actually making one a child link 32 and the other a non-associated link 30 at this point). In FIG. 11 left side front and rear foot links 42 have been added. In FIG. 12 the author has rotated the view in the character editor screen 218 (via a hot-key access to a camera button matrix; such are described in more detail for the action editor 208 and the behavior editor 210, below) and symmetrically copied the left side foot links 42 to create right side foot links 42 also. In FIG. 13 basic head link 34 sub-structure is added to the synthetic creature 10, and in FIG. 14 the full synthetic creature 10 is structurally complete.

The Action Editor:

To implement the inventors' definition of a synthetic creature 10 a tool is also needed to author new actions 18, to edit existing actions 18, and to test actions 18. In the preferred embodiment of the present invention this role is filled by an action editor 208. As previously discussed, actions 18 are organized into and stored in (unordered) lists. In the inventors' presently preferred embodiment, the only actions 18 handled in the action editor 208 are movements 50. Although noises 52 are conceptually also actions 18, they are specified later in the behavior editor 210. One rationale for this is that the ability to enter, change, and test noises 52 only has usefulness to authors at the layer 12 of behaviors 20. However, it should be appreciated that this is a matter of design preference, and that noises 52 and even other types of actions 18, as might be custom defined for special implementations, could be handled by other straight-forward implementations of the action editor 208.

Figure 16:
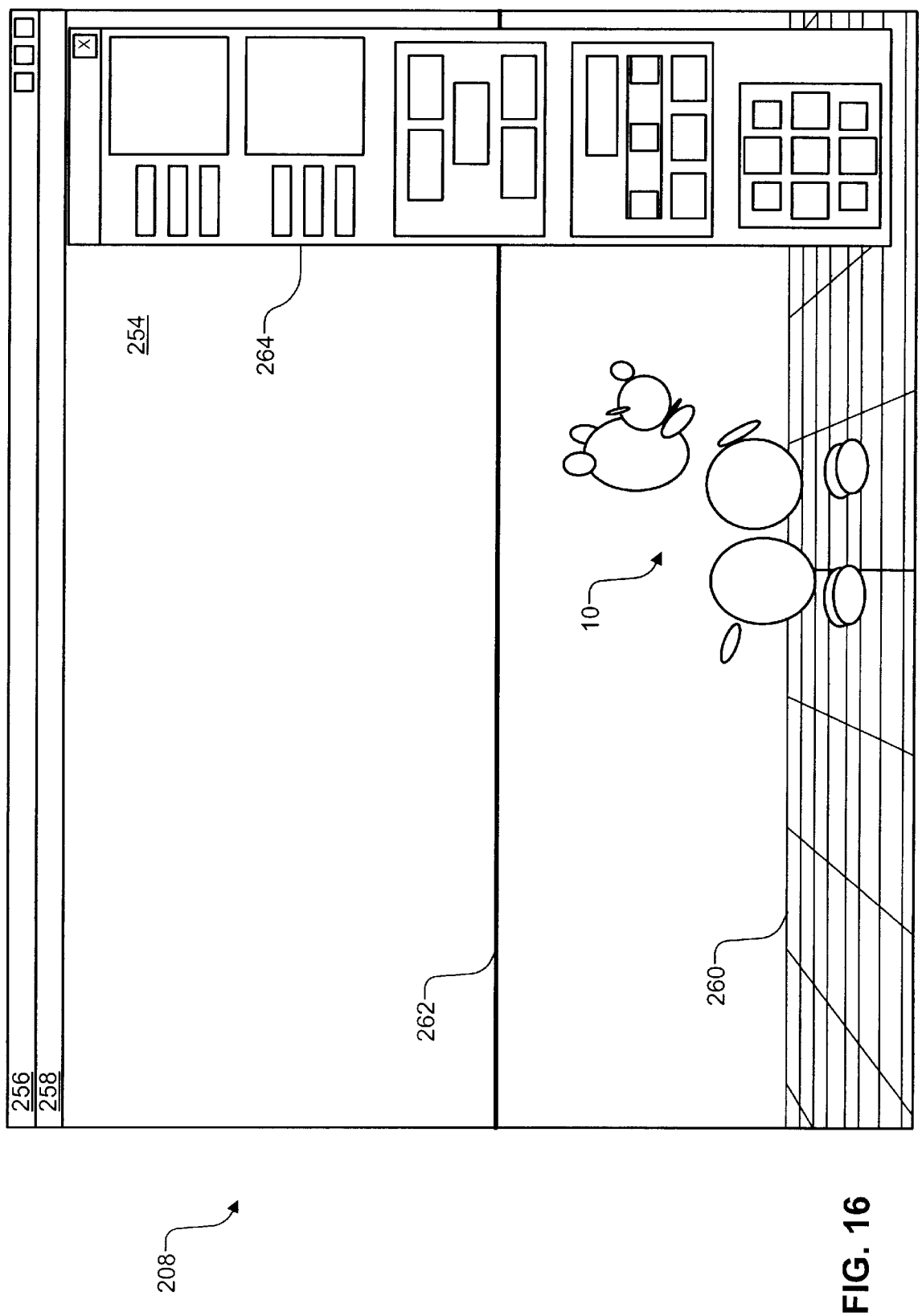
FIG. 16 is a screen capture of a typical animal editor of the present invention in use.
Figure 17:
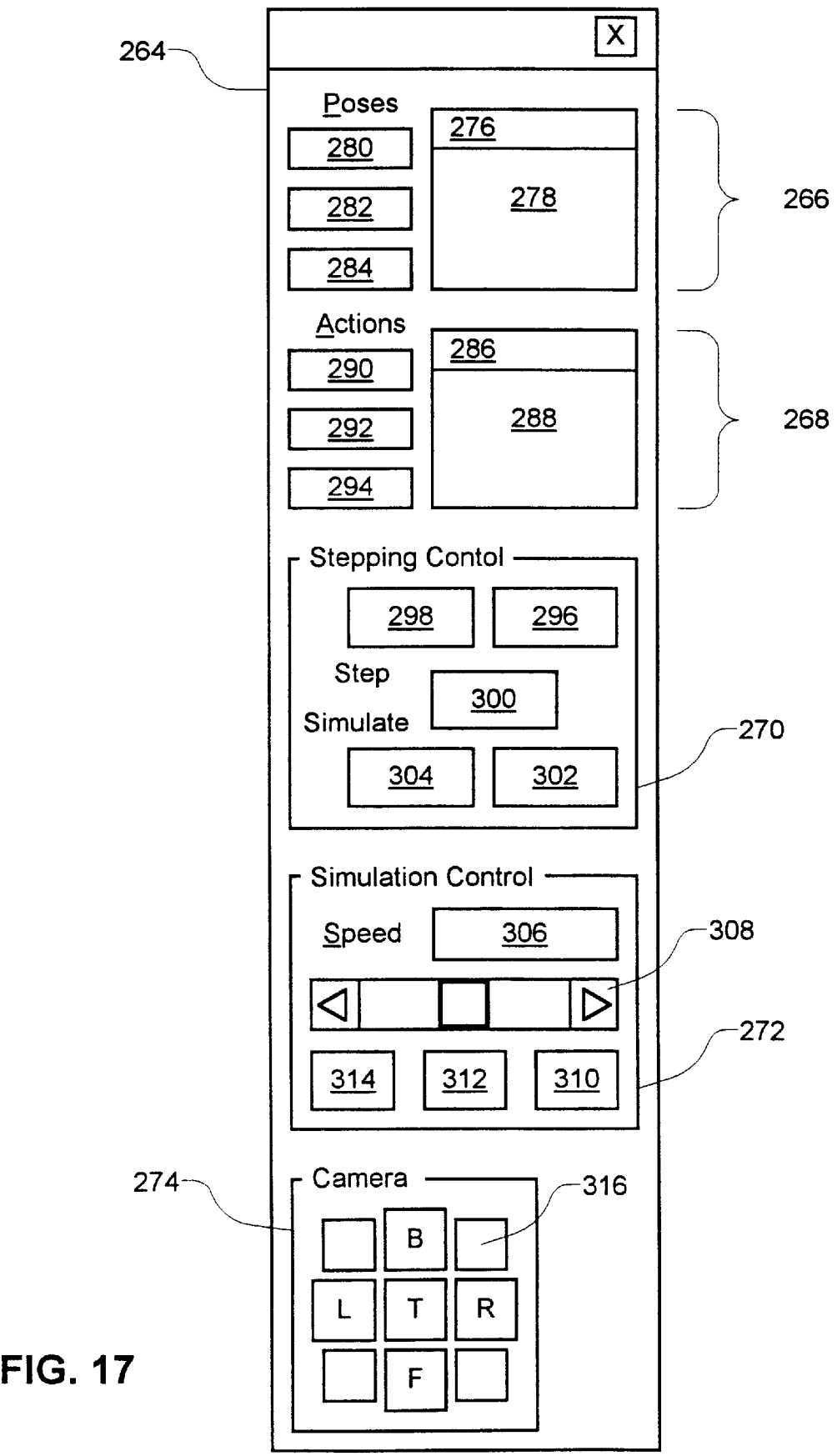
FIG. 17 is an expanded view of a key part of FIG. 16.

FIG. 16 and FIG. 17 depict screen-captures taken of a typical action editor 208 in use. In FIG. 16 the action editor 208 presents an author with an action editor screen 254 which at its top includes an information bar 256 and a menu bar 258. Once loaded (by opening a file containing a definition of character 16), a synthetic creature 10 appears centered in the action editor screen 254 above a floor grid 260 and with a horizon line 262 across the background. Further appearing, and author dragable anywhere within the action editor screen 254, is a keypose controls window 264.

FIG. 17 shows the keypose controls window 264 of FIG. 16 in more detail. The preferred keypose controls window 264 includes five major groups of sub-controls, including a pose controls group 266, an action controls group 268, a stepping controls group 270, a simulation controls group 272, and a camera controls group 274.

The preferred pose controls group 266 provides author control over individual pose 58 details, and includes a pose id line 276, a pose id list 278, a create pose button 280, a reset pose button 282, and a delete pose button 284. The name of the current pose 58 of the current action 18 is presented in the pose id line 276, and an ordered list of poses 58 (FIG. 17) is presented in the pose id list 278. Appropriate selection (e.g., via a conventional selection mechanism like double-clicking with a mouse, or scrolling and pressing an enter key) of a pose 58 in the pose id list 278 makes that pose 58 the selected pose 58, and makes its name appear in the pose id line 276. If the list exceeds the space available, the pose id list 278 becomes scrollable. (In the figures, the pose id line 276 and the pose id list 278 somewhat appear to be one, however they are functionally distinct.)

Creation of a new pose 58 for the presently selected action 18 is accomplished by pressing the create pose button 280. In the preferred embodiment poses 58 are automatically named pose0, pose1, pose2, etc. Therefore, once the create pose button 280 is pressed a new name appears in the pose id line 276. The author then clicks and drags links 26 of the current pose 58 of the synthetic creature 10 in the action editor screen 254 until satisfied with the pose 58. Double clicking the pose id line 276 saves the present pose 58 into the presently selected action 18, a new pose 58 is placed after the presently selected pose 58. At any point prior to this save operation an author may press the reset pose button 282, to start over with the links 26 of the synthetic creature 10 in their original normal pose 59. However, after this save operation an author must either use the delete pose button 284 to remove a selected pose 58 or else edit the pose 58. Editing of existing poses 58 is accomplished by selecting the desired pose 58, clicking and dragging the links 26 where desired, and resaving the pose 58.

The preferred action controls group 268 provides author control over details of individual actions 18, and includes an action id line 286, an action id list 288, a new action button 290, a group actions button 292, and a clone action button 294. Similar to the pose controls group 266, the name of the current action 18 and an ordered list (scrollable if large) of the actions 18 for current the synthetic creature 10 are presented. Selection of actions 18 may also be done similarly.

Creation of a new action 18 is accomplished by pressing the new action button 290. A default name for the action 18 is presented (e.g., action0, action1, etc.), but unlike poses 58 the name of an action 18 is editable in the action id line 286. The author may then create poses 58 for the action 18 with the pose controls group 266, ultimately double clicking on the action id line 286 to save the action 18. Note however that no step times 60 have been specified yet. In the preferred embodiment a default step time 60 is provided between all poses 58, and individual step times 60 are later tuned by the author as desired. Predictably, editing of existing actions 18 is done by selection and use of the pose controls group 266. The group actions button 292 combines a group of existing poses 58, selected in the pose id list 278, into a new action 18 (an authoring convenience, since many actions are quite similar). The clone action button 294 copies a selected action 18 into a new action 18, which is given a default name until the author changes it in the action id line 286.

The preferred stepping controls group 270 and simulation controls group 272 work partially in concert. The stepping controls group 270 includes a step forward button 296, a step backward button 298, a toggle pose button 300, a simulate forward button 302, and a simulate backward button 304. The simulation controls group 272 includes a step speed line 306, a step speed slider 308, a start simulation button 310, a stop simulation button 312, and a reset simulation button 314.

An author may step through the poses 58 of an action 18 by using the step forward button 296 and the step backward button 298. Such stepping, however, merely presents poses 58 in snapshot fashion. To see an action 18 played back in motion picture fashion (i.e., engaging the full characteristics of the character 16 and the universe 14), the author uses the simulate forward button 302 and the simulate backward button 304. Finally, the toggle pose button 300 toggles between the two most recent poses 58, a redundant capability, but a single button authoring convenience.

An author tailors step times 60 between individual poses 58 in a selected action 18 by either operating the step speed slider 308 or directly editing the value displayed in the step speed line 306 of the simulation controls group 272. Usually authors want to try several values, and thereby "tune" step times 60. This is where many authors appreciate the toggle pose button 300. The start simulation button 310, stop simulation button 312, and reset simulation button 314 control simulation of an entire selected action 18.

Finally, the camera controls group 274 includes a view selection button matrix 316, which predictably controls orientation of an author's view of the synthetic creature 10 in the action editor screen 254.

The Behavior Editor:

To implement the inventors' definition of a synthetic creature 10 a tool is also needed to author new behaviors 20, to edit existing behaviors 20, and to test behaviors 20 of a synthetic creature 10. In the preferred embodiment, this role is filled by a behavior editor 210. As previously discussed, behaviors 20 are organized into and stored as a behavior tree 72 of optionally recursive sub-behaviors 74. Some possible types of sub-behaviors 74 are actions 18 (e.g., movements 50), a sequential sub-behavior 76, a parallel sub-behavior 78, a decision sub-behavior 80, and an interruptible sub-behavior 82. However, this list should not be interpreted restrictively. To date the inventors have found these types adequate for their needs, but other pre-defined types are quite possible, and for some behavior editor 210 implementations perhaps desirable, even if only as an authoring convenience.

Figure 18:
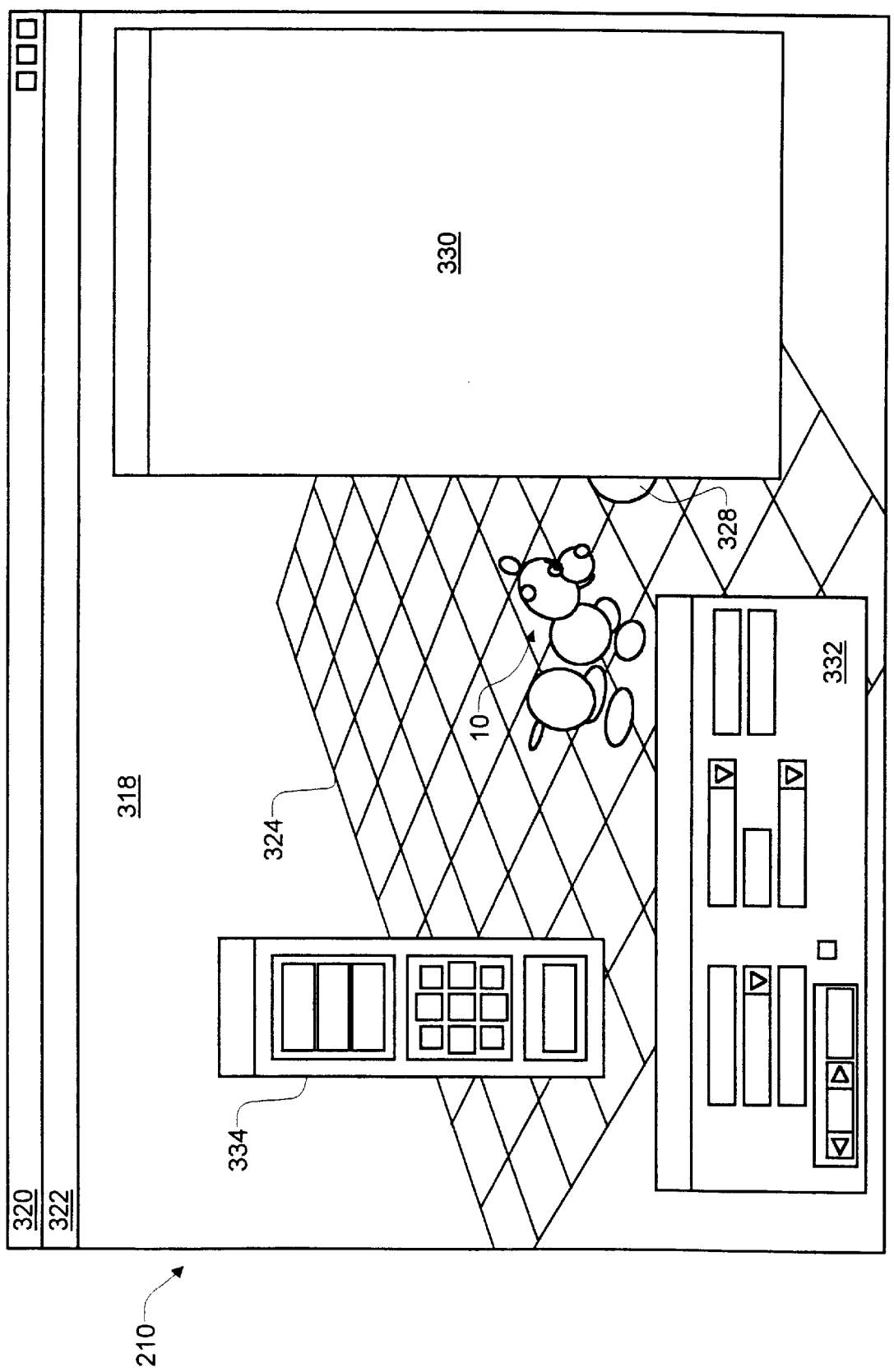
FIG. 18 is a screen capture of a typical behavior editor of the present invention in use.

FIG. 18 depicts a screen-capture of a typical behavior editor 210 in use. The behavior editor 210 presents an author with a behavior editor screen 318 which at its top includes an information bar 320 and a menu bar 322. Once a file of actions 18 is loaded (a conventional file open operation), a synthetic creature 10 appears centered in the behavior editor screen 318 above a floor grid 324 and with a horizon line 326 across the background (not shown due to the downward angle of view in this figure, an equivalent example is the horizon line 262 of the action editor 208 in FIG. 16). The first pose 58 of the first action 18 of the loaded synthetic creature 10 is that initially presented. Further appearing, and each able to be dragged by the author anywhere within the behavior editor screen 318, are a stimuli ball 328, a behavior tree window 330, a behavior properties window 332, and a behavior controls window 334.

The stimuli ball 328 is dragged by the author where any stimuli 62 is desired to occur for testing purposes (the environment 22 and the user will ultimately provide different actual stimuli 62 at run-time). As previously discussed, all stimuli 62 are treated as having a world position 68 within the environment 22, and it is the position of the stimuli ball 328 which is used to simulate this during authoring.

Figure 19:
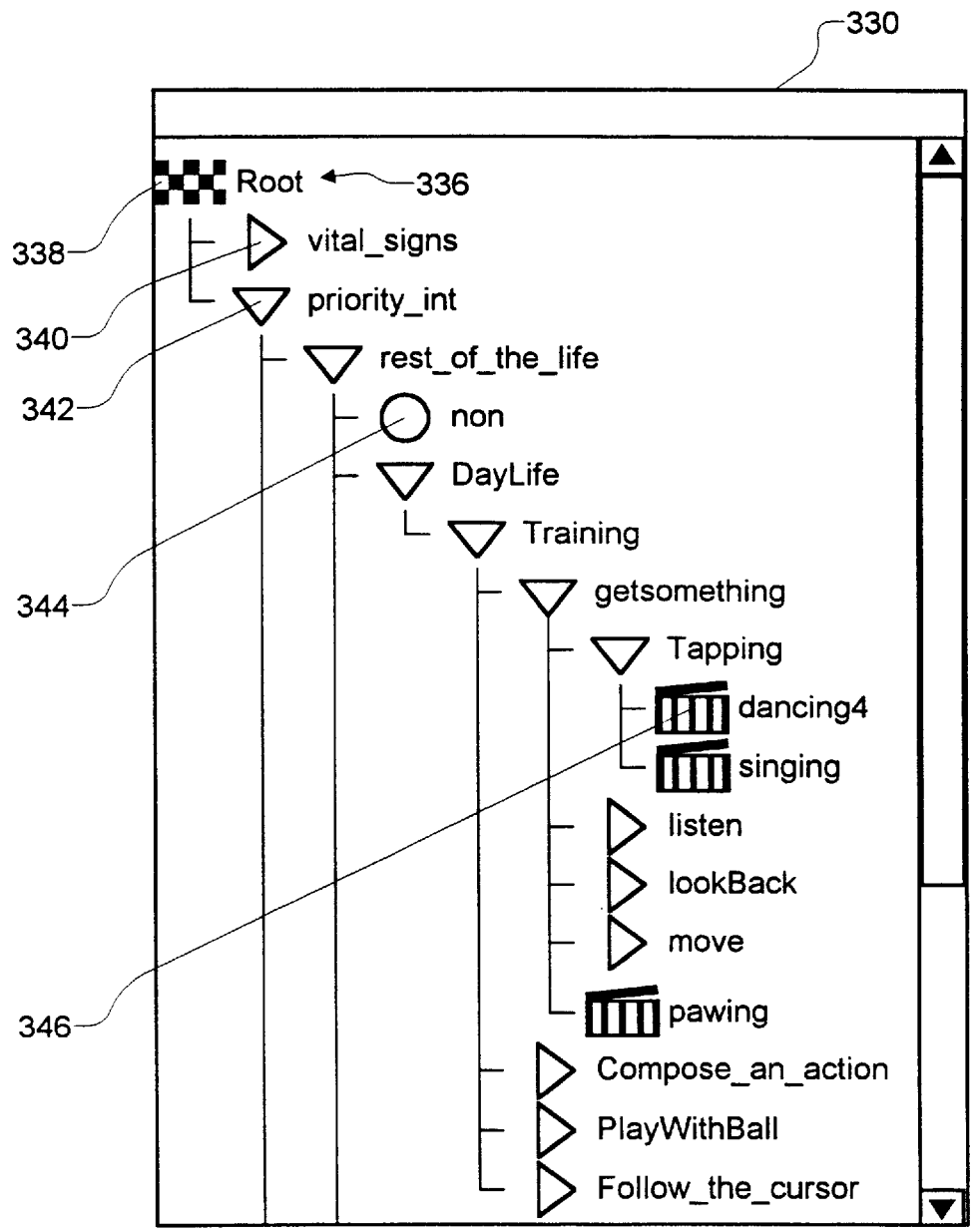
FIG. 19, FIG. 20 and FIG. 21 are expanded views of key controls windows in FIG. 18.

FIG. 19 shows a typical behavior tree window 330 in detail. The behavior tree window 330 will contain a depiction of a behavior tree 72 for a synthetic creature 10, constructed out of various icons representing branches and leafs, and unique labels identifying sub-behaviors 74. If a new behavior tree 72 is being opened (i.e., authored), only a root node 336 will be present. In the preferred embodiment a checkered flag icon 338 is used to represent the starting point of the currently selected sub-behavior 74, which initially will be at the root node 336 of the behavior tree 72. Right-pointing triangle icons 340 are used to represent collapsed branches, which each include a non-visible ordered list of multiple sub-behaviors 74. Down-pointing triangle icons 342 are used to represent expanded branches, which each include a visible ordered list of multiple sub-behaviors 74. Filled circle icons 344 are used to represent unique leafs, which each include a single primitive (i.e., non-recursive) sub-behavior 74 (but not merely an action 18). Finally, clap-stick icons 346 are used to represent leafs which include only an action 18 (e.g., noises).

Figure 20:
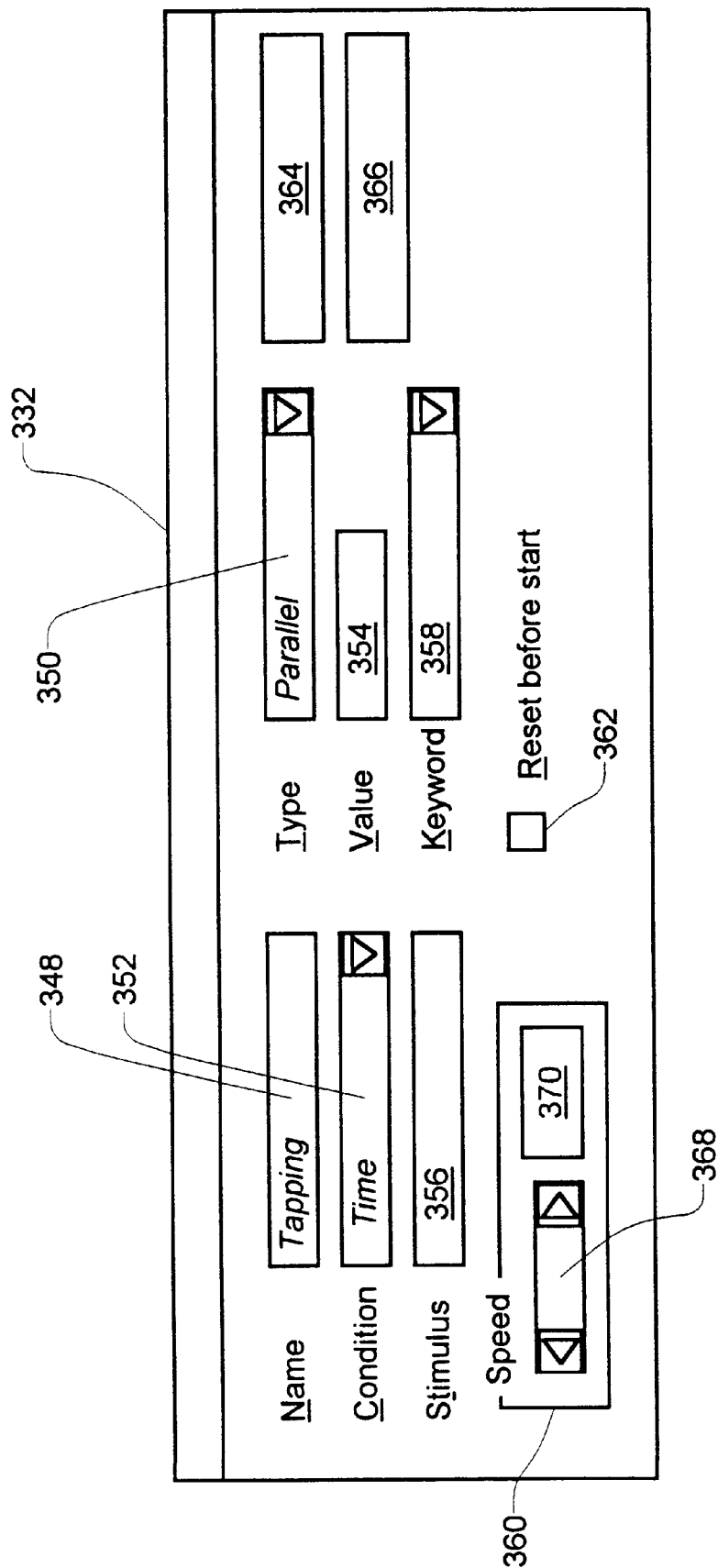

FIG. 20 shows the behavior properties window 332 in detail. The behavior properties window 332 permits an author to add sub-behaviors 74 to and edit existing sub-behaviors 74 in the behavior tree 72. The behavior properties window 332 includes a behavior label line 348, a behavior type list 350, a behavior condition list 352, a behavior condition value line 354, a stimuli name line 356, a behavior keyword list 358, a behavior speed control sub-group 360, a behavior reset checkbox 362, a behavior attachment button 364, and a behavior set-start button 366. The behavior speed control sub-group 360 includes a behavior speed slider 368 and a behavior speed line 370. Controls which are not available in particular scenarios are grayed out (not depictable in the line-art renditions used in the figures).

The label of a sub-behavior 74 is entered by the author into the behavior label line 348. If the label is unique, creation of a new sub-behavior 74 is presumed. If the label matches one already in the present behavior tree 72, editing of the matching sub-behavior 74 is presumed, and the other controls in the behavior properties window 332 will reflect present parameters for that sub-behavior 74. Double-clicking a label in the behavior tree window 330 is also a way to "enter" that label into the behavior label line 348, and thus to select that particular behavior 20 for editing. If the label entered is the name of a sound file (indicated by ".WAV" or another conventional sound file type file suffix in the preferred embodiment), a noise 52 becomes the entered sub-behavior 74. The inventors' conceptually regard noise 52 as a form of action 18, but for convenience handle them here in the behavior editor 210.

In FIG. 19 and FIG. 20 the behavior type list 350 selection reflects that the "tapping" sub-behavior 74 is a parallel sub-behavior 78. If a totally new (i.e., unique) label had been entered in the behavior label line 348 the author would have to specify a type of sub-behavior 74 from the behavior type list 350.

The behavior condition list 352 and the behavior condition value line 354 provide for selection of how the sub-behavior 74 will perform. In the preferred embodiment, the behavior condition list 352 presents a list of conditions 372 (see e.g., FIG. 1) types, which include a time condition 374, a one-pass condition 376, and a call-back condition 378. If the time condition 374 is chosen, the sub-behavior 74 will run for a period of time specified by the author in the behavior condition value line 354. Values are in seconds, with special cases such as zero used to indicate to not run a sub-behavior 74 (useful for testing), and negative one used to indicate that the sub-behavior 74 should run forever. If the selected sub-behavior 74, including any possible lower branch sub-behaviors 74 (for example, the "dancing4" action 18 which is part of "tapping"), has not finished by the time specified in the behavior condition value line 354, then its execution will be cut short. If a sub-behavior 74 finishes early it starts 30 over, and runs until time has expired. In contrast, the one-pass condition 376 specifies that the present sub-behavior 74 should execute exactly once. The behavior condition value line 354 is grayed out if a one-pass condition 376 is chosen.

It should be appreciated that implementing other special conditions 372 is quite possible. For example, a multi-pass condition, with the behavior condition value line 354 used to enter the number of passes, and perhaps with zero and negative values working as described above.

The call-back condition 378 is one of the inventors' catch all control provisions. It is where special conditions 372 may be implemented with customized modules. Users may enter or select and pass control information to specific call-back conditions 378 using the behavior keyword list 358. One example might be a "chaseBall" until "closeEnugh" situation, using a "chaseBall" sub-behavior 74 with a "closeEnugh" evaluation that is more complicated than the mere binary yes vs. no state change of a stimuli 62. Examples of typical keyword information might by strings like "right" or "up."

The stimuli name line 356 is grayed out except when an interruptible sub-behavior 82 is selected. This type of sub-behaviors 74 requires author entry of text identifiers for specifying stimuli 62 to act as key stimuli 92. Since stimuli 62 are not evaluated until run-time, any text string can be used, and if such a string is not set by the environment 22 at run-time the associated sub-behavior 94 will be ignored.

For decision sub-behaviors 80 the behavior attachment button 364 is used to open a menu (not shown) of available sub-behaviors 74 and to select one to attach to the decision sub-behavior 80. In the currently preferred embodiment of the behavior editor 210, probability (determined at run-time) is used to determine which attached sub-behavior 74 will run, with all attached sub-behaviors 74 in a decision sub-behavior 80 initially assigned equal probability. However, the author may override this by selecting an attached sub-behavior 74 and modifying its weighting factor 88, which will appear in the behavior condition value line 354. A weighting factor 88 of zero may be entered in the behavior condition value line 354 to insure that a particular sub-behavior 74 in a decision sub-behavior 80 will not run, which is useful for testing purposes.

Particular parameters for action 18 type sub-behaviors 74 may be set with the behavior speed control sub-group 360. For example, if the "singing" sub-behavior 74 (FIG. 19) is selected, the behavior speed control sub-group 360 and the behavior reset checkbox 362 would cease to be grayed out. The author could then use the behavior speed slider 368 or manual text editing in the behavior speed line 370 to change the execution time. The behavior reset checkbox 362 is used to request that links 26 of the synthetic creature 10 be reset to the "pose0" pose 58 of the action 18 before it begins execution.

Finally, the behavior set-start button 366 moves the checkered flag icon 338 to the highlighted current sub-behavior 74 (FIG. 18) in the behavior tree window 330, making it a test starting point. (In the inventors' preferred embodiment the behavior set-start button 366 is in the behavior properties window 332, but it could just as easily be placed in the behavior controls window 334, or elsewhere.)

Figure 21:
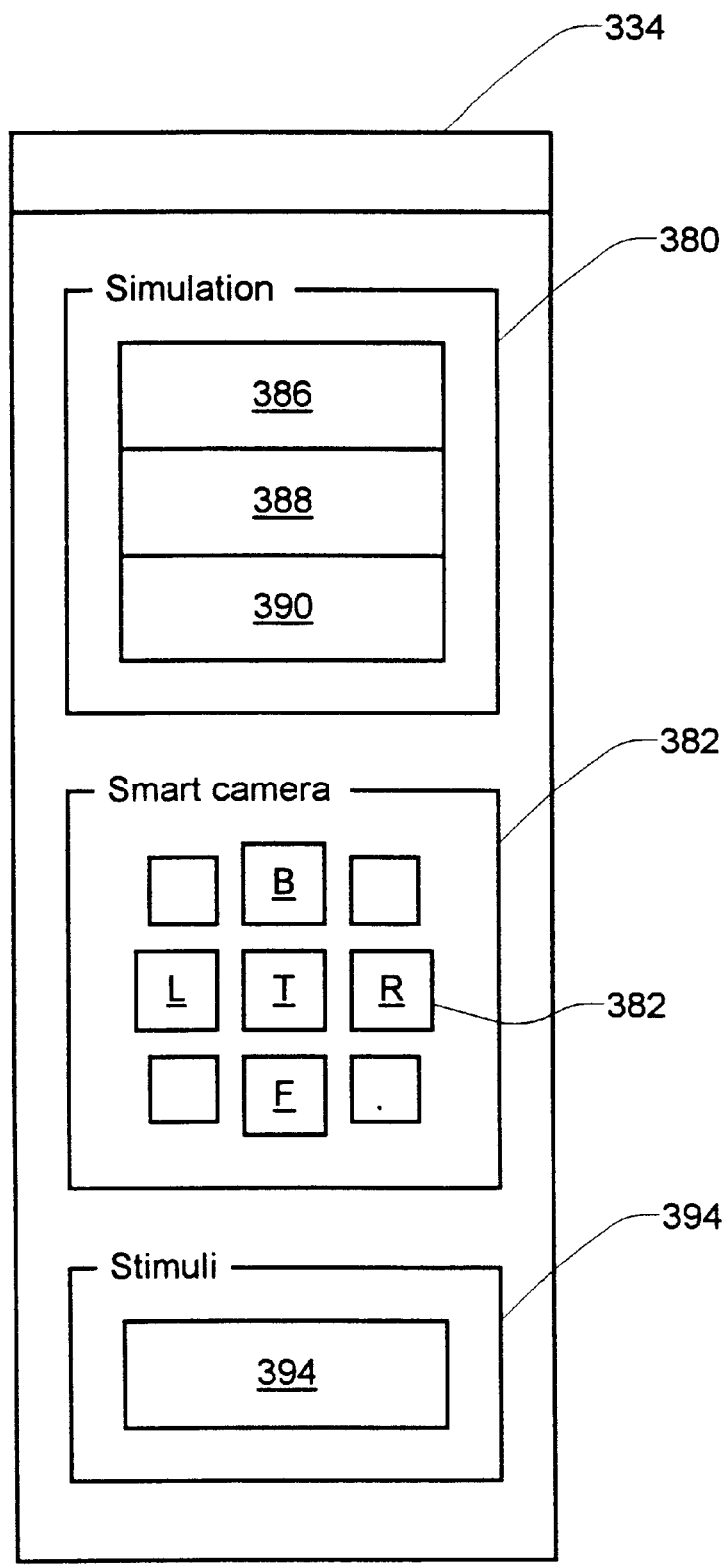

FIG. 21 shows the behavior controls window 334 in detail. The preferred behavior controls window 334 includes a simulation sub-control group 380, a camera sub-control group 382, and a stimuli sub-control group 384. The simulation sub-control group 380 includes a simulation start button 386, a simulation stop button 388, and a simulation reset button 390. In predictable fashion, an author may use the simulation sub-control group 380 to execute either the entire behavior tree 72 or the sub-behavior 74 which is selected as the current test starting point, and watch the synthetic creature 10 carry out the behavior 20 in the behavior editor screen 318. To facilitate authors being able to see relevant aspects of the synthetic creature 10 under test, the camera sub-control group 382 changes the direction of view of the synthetic creature 10 (a view selection button matrix 392 is used, in similar manner to use of the camera controls group 274 in the action editor 208). Finally, the stimuli sub-control group 384 is a stimuli generate button 394. This opens a scroll box of stimuli 62 (the present type of sub-behavior 74 must be either a decision sub-behavior 80 or an interruptible sub-behavior 82, or this will have no effect). Double-clicking a label for a stimuli 62 triggers it and causes it to be perceived as originating at the current location of the stimuli ball 328 (recall that an author user may drag this anywhere in the behavior editor screen 318).

The Environment Editor:

To implement the inventors' definition of a synthetic creature 10 one or more tools are desired to author new environments 22, to edit existing environments 22, and to test environments 22 of a synthetic creature 10. In the preferred embodiment, these roles are filled by a package of tools which will here be termed the environment editor 212.

In the inventors' preferred embodiment the environment editor 212 functions largely as a tool to integrate existing elements into environments 22, and to specify how the environment 22 produces stimuli 62. For example, bit-maps are needed for the visual backdrop 106 (e.g., for the ground or floor shown in a base surface 112 and background scenes and walls shown In a distance view 114). Off-screen sound s may also be desired as part of the environment 22. Excellent tools for producing bit-maps and sound files already exist and are widely available, so the inventors' preferred environment editor 212 is used for integrating pre-defined elements into environments 22. As previously noted, all stimuli 62 have an associated world position 68. In the environment editor 212 authors are able to define where such world positions 68 will be at run-time, for example tying them to static objects 108 and even dynamic objects 110.

Environments 22 can vary in complexity from effectively non-existent to quite complex (technically the action editor screen 254 and the behavior editor screen 318 are environments 22). However, using the previously described techniques, development of the layers 12 below the environment 22 (e.g., characters 16, actions 18, and behaviors 20) are abstracted out, thus relieving authors of the need to concern themselves with environments 22 until necessary (if ever, since environments 22 for synthetic creatures 10 might become a commodity, purchased from vendors for authors to use or for users to play or work with their synthetic creatures 10 in).

The Run-time computer:

A key goal of the present invention has been to permit use of synthetic creatures 10 on conventional computer systems today, and, in large, this means personal computers (say four megabytes of memory and a 32-bit processor, although more powerful engineering type workstations and even mainframe type computers can of course be used as well). That goal is met due to the efficient characters 16, actions 18, and behaviors 20 for synthetic creatures 10 which are now possible with the present invention.

In addition to the above mentioned examples, various other modifications and alterations of the synthetic creature 10, the universe editor 204, the character editor 206, the action editor 208, the behavior editor 210, and the environment editor 212 may be made without departing from the spirit of the present invention.

INDUSTRIAL APPLICABILITY

The present synthetic creature 10 is well suited for application in real-time computer generated amusements. The inventors have worked considerably with synthetic creatures 10 for the purposes of developing "virtual pets," finding that they exhibit very life-like and amusing capabilities which makes them desirable to users, yet that they also run well on even personal computer systems having what are today regarded as conventional memory and processor resources.

The present synthetic creature 10 is also well suited for application in highly complex applications, such as computer graphics, cartoon drafting, computer game scripting, advertising, complex simulations of living organisms, and imparting life-like characteristics to simulations of physical objects. Further, while many of these applications are also in the general category of amusements, the present invention may also be widely applied as a teaching tool. Aside from the more obvious application to teaching of computer graphics and simulation technique, the synthetic creature 10 may also used to teach principles of physics, mechanics, dynamics, anatomy, and control theory.

The present authoring tools (i.e., the universe editor 204, the character editor 206, the action editor 208, the behavior editor 210, and the environment editor 212) are well suited for application in developing the inventive synthetic creatures 10 and may also be applied to teaching computer graphics and simulation techniques.

Both the inventive synthetic creature 10 and the inventive authoring tools may be implemented on a large range of computer systems in use today, including personal computers, engineering type computer workstations, and mainframe computers. Further, both the inventive authoring tools and the inventive synthetic creature 10 may easily be adapted for use with computer networks, including the Internet. The present authoring tools are quite easily implemented for network server installation and remote network client use, much in the same manner that word processor and computer aided design programs are run on networks today. Simpler implementations of synthetic creatures 10 may even execute remotely yet be viewed locally, even with current network bandwidth limitations (e.g., the 28.8K baud modem access rate of many who today access the Internet). Virtually all implementations of the synthetic creature 10 should be transferable over networks. For example, a virtual aquarium might be stocked with virtual fish synthetic creatures 10, with the owner able to log onto a remote "pet store" on the Internet, to add to their collection or replace pets who have "died" from old age or lack of owner interaction (i.e., virtual feeding and virtual affection).

For the above, and other, reasons, it is expected that the synthetic creature 10 and the authoring tools of the present invention will have widespread industrial applicability.

Therefore, it is expected that the commercial utility of the present invention will be extensive and long lasting.

What is claimed is:

1. A method of creating a synthetic creature simultation which runs on a computer system, the method comprising:

authoring a character for the synthetic creature by defining a link, and defining additional links and joining each said additional link to a previously defined said link with a soft joint; and authoring a plurality of actions for the synthetic creature by positioning said character into a pose by moving said links into desired positions, and storing at least one said pose into each said action, to execute on the computer system.

2. The method of claim 1, further including:

tailoring a set of link properties for each said link, including at least one member of the set consisting of link color properties, a link visibility property, link physical properties, and link skin properties.

3. The method of claim 2, wherein:

said link color properties include at least one member of the set consisting of hue, saturation, brightness, reflectivity, and refractivity;

said link visibility property is chosen from the set consisting of shading opacity, invisibility;

said link physical properties include at least one member of the set consisting of shape, density, and buoyancy; and said link skin properties include at least one member of the set consisting of mesh and texture.

4. The method of claim 1, further including:

tailoring a set of joint properties for each said joint, including at least one member of the set consisting of joint type, and joint dynamics.

5. The method of claim 4, wherein:

said joint type is chosen from the set consisting of attached, jointed, dynamic, and massy; and said joint dynamics include at least one member of the set consisting of slide speed, screw speed, and restore time.

6. The method of claim 1, further includes:

tailoring step times between sequential pairs of said poses within said actions.

7. The method of claim 1, wherein:

a neutral pose is defined by authoring of said character; and further including:

tailoring a set of action properties for each said action, which includes whether said action resets to said neutral pose before running as part of the synthetic creature on the computer system.

8. The method of claim 1, wherein:

authoring said actions includes specifying at least one computer recorded sound file.

9. The method of claim 1, wherein:

said actions are stored in a library, and selectively retrieved from said library, for reusability when authoring said behavior trees.

10. The method of claim 1, wherein:

said character is a first character; and said actions are stored in a library, and selectively retrieved from said library, and for reusability with a second character.

11. An tool for creating a synthetic creature with the method of claim 1, the tool comprising a computer system upon which a user authors said action.

12. A computer system executing a synthetic creature created with the method of claim 1.

13. The method of claim 1, further including:

authoring a behavior tree for the synthetic creature by defining behaviors by grouping instances of said actions and previously defined instances of said behaviors, and ordering said behaviors recursively into said behavior tree in a hierarchical structure which is executable on the computer system.

14. The method of claim 13, further including:

choosing a behavior termination condition from the set consisting of:

timed termination, which defines said behavior to execute until a period of time elapses;

single pass termination, which defines said behavior to execute only once; and multiple pass termination, which defines said behavior to execute a specified number of times.

15. The method of claim 13, wherein:

said behaviors are stored in a library, and selectively retrieved from said library, for reusability when authoring said behavior trees.

16. The method of claim 13, wherein:

said character is a first character; and said behaviors are stored in a library, and selectively retrieved from said library, for reusability with a second character.

17. An tool for creating a synthetic creature with the method of claim 13, the tool comprising a computer system upon which a user authors said behavior.

18. A computer system executing a synthetic creature created with the method of claim 13.

19. The method of claim 11, further including:

choosing said behaviors from the set consisting of sequential type behavior, parallel type behavior, interruptible type behavior, and decision type behavior.

20. The method of claim 19, wherein:

said sequential type behavior executes each of said behaviors and said actions grouped therein sequentially on the computer system.

21. The method of claim 19, wherein:

said parallel type behavior executes all of said behaviors and said actions grouped therein in parallel on the computer system.

22. The method of claim 19, wherein:

specifying said interruptible type behavior further includes the steps of specifying at least one stimuli-behavior pair by associating a key stimuli with an associated behavior, ordering said stimuli-behavior pairs, and specifying a default behavior; wherein said interruptible type behavior executes by evaluating all key stimuli of said stimuli-behavior pairs, running the first said stimuli-behavior pair having a said key stimuli which is set, and running said default behavior if no said key stimuli is set.

23. The method of claim 19, wherein:

specifying of said decision type behavior further includes specifying a set of probable behaviors by choosing at least one behavior; wherein said decision type behavior executes by picking in a random manner one member of said set of probable behaviors, and running said behavior.

24. The method of claim 23, further including:

influencing the probability of members of said set of probable behaviors being executed by specifying a weighting factor for at least one of said probable behaviors.

* * * * *